(12) United States Patent
Dundon

(10) Patent No.: US 7,046,151 B2
(45) Date of Patent: May 16, 2006

(54) INTERACTIVE BODY SUIT AND INTERACTIVE LIMB COVERS

(75) Inventor: Michael Dundon, Coppell, TX (US)

(73) Assignee: Michael J. Dundon, Coppell, TX (US)

( * ) Notice: Subject to any disclaimer, the term of this patent is extended or adjusted under 35 U.S.C. 154(b) by 243 days.

(21) Appl. No.: 10/650,551

(22) Filed: Aug. 28, 2003

(65) Prior Publication Data

US 2005/0012485 A1    Jan. 20, 2005

Related U.S. Application Data

(63) Continuation of application No. 60/487,029, filed on Jul. 14, 2003.

(51) Int. Cl.
*G08B 23/00* (2006.01)

(52) U.S. Cl. .............. 340/573.1; 340/407.1; 434/114; 463/36; 600/38

(58) Field of Classification Search ............ 340/693.8, 340/573.1 X, 568.1, 407.1 X; 463/36 X; 345/8; 706/924; 128/845, 924, 920, 925; 434/257, 114 X; 348/157; 718/1; 703/11; 709/201; 600/587, 38 X
See application file for complete search history.

(56) References Cited

U.S. PATENT DOCUMENTS

| | | | |
|---|---|---|---|
| 5,229,756 A | 7/1993 | Kosugi et al. ............... 340/706 |
| 5,264,768 A | 11/1993 | Gregory et al. ............. 318/561 |
| 5,337,758 A | 8/1994 | Moore et al. ................ 128/781 |
| 5,459,382 A | 10/1995 | Jacobus et al. ........... 318/568.1 |
| 5,490,784 A | 2/1996 | Carmein ....................... 434/55 |
| 5,563,988 A | 10/1996 | Maes et al. .................. 395/121 |
| 5,577,981 A | 11/1996 | Jarvik ............................ 482/4 |
| 5,583,478 A * | 12/1996 | Renzi ...................... 340/407.1 |
| 5,684,943 A | 11/1997 | Abraham et al. ........... 395/173 |
| 5,754,189 A | 5/1998 | Doi et al. ..................... 45/473 |
| 5,846,134 A | 12/1998 | Latypoy ...................... 463/46 |
| 5,913,727 A * | 6/1999 | Ahdoot ........................ 463/39 |
| 5,963,891 A | 10/1999 | Walker et al. .............. 702/150 |
| 5,980,256 A | 11/1999 | Carmein ....................... 434/55 |
| 6,106,397 A | 8/2000 | Phillips ........................ 436/36 |
| 6,125,385 A | 9/2000 | Wies et al. .................. 709/203 |
| 6,128,004 A | 10/2000 | McDowall et al. ......... 345/158 |

(Continued)

Primary Examiner—Brent A. Swarthout

(57) ABSTRACT

A system, apparatus and method, consisting of firmware, software, oscillating motors, a garment, and peripherals that permit users to interact over the Internet or wireless communications network with games or each other users whereby the sensation of touch is felt by the garment user. The invention consists of an interactive body suit that covers the torso. Peripheral gloves, socks, and adult entertainment attachments for men and women attach to the interactive body suit in appropriate locations.

Small oscillating motors embedded in the garment and the peripherals produce a vibrating touch sensation when activated. Each motor has a logic address on the suit or peripheral device that correlates to a logical point on a computer graphic representing the user. Contact with the graphic will generate a command signal that activates a motor in the corresponding area on the suit. In one application, limb covers with embedded oscillating motors are used to provide medical treatment massage therapy.

20 Claims, 15 Drawing Sheets

HIGH LEVEL PROCESS FLOW

U.S. PATENT DOCUMENTS

| | | |
|---|---|---|
| 6,270,414 B1 | 8/2001 | Roelofs ..................... 463/36 |
| 6,285,379 B1 | 9/2001 | Gallery ..................... 345/473 |
| 6,368,268 B1 * | 4/2002 | Sandvick et al. ............ 600/38 |
| 6,786,863 B1 * | 12/2002 | Abbasi ..................... 600/38 |
| 6,695,770 B1 * | 2/2004 | Choy et al. ................ 600/38 |
| 6,793,619 B1 * | 9/2004 | Blumental .................. 600/38 |
| 2001/0003712 A1 | 6/2001 | Roelofs ..................... 463/37 |
| 2001/0043847 A1 | 11/2001 | Kramer ..................... 414/5 |
| 2002/0080094 A1 | 6/2002 | Biocca et al. ............... 345/8 |
| 2002/0116352 A1 | 8/2002 | Kilgard et al. .............. 706/25 |
| 2002/0140633 A1 | 10/2002 | Rafii ....................... 345/8 |
| 2002/0191011 A1 * | 12/2002 | Rasouli ..................... 345/702 |
| 2004/0046777 A1 * | 3/2004 | Tremblay et al. ............ 345/702 |
| 2004/0125120 A1 * | 7/2004 | Weiner ..................... 345/701 |
| 2005/0014560 A1 * | 1/2005 | Blumenthal ................. 463/36 |
| 2005/0027794 A1 * | 2/2005 | Decker ..................... 709/201 |
| 2005/0113167 A1 * | 5/2005 | Buchner et al. ............. 463/30 |

* cited by examiner

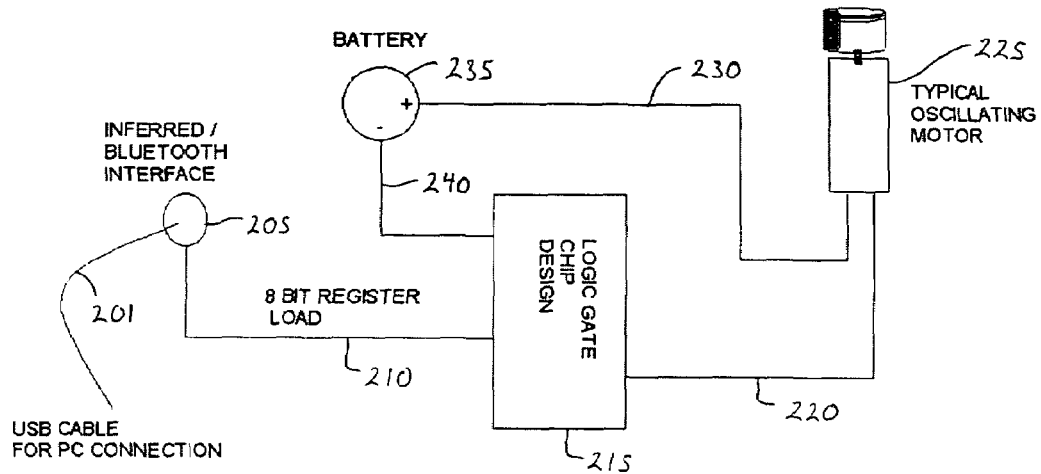
FIGURE 2. HIGH LEVEL PROCESS FLOW
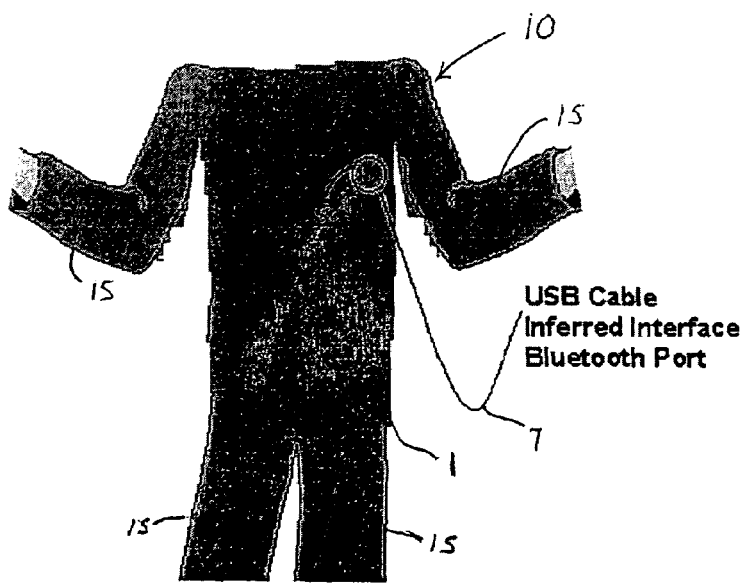
FIGURE 1  INTER-ACTIVE BODY SUITE (PICTURES OF OBJECTS, LOGIC GATES, PSUDEO CODE)
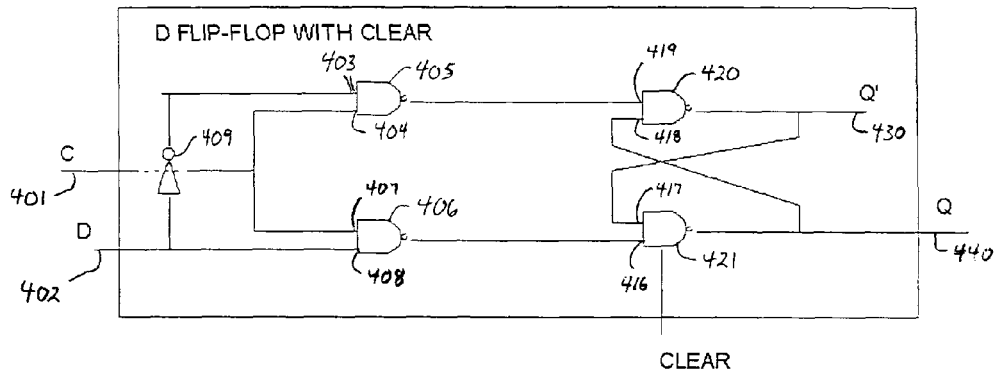
Figure 3 - Logic Gate Tables
FIGURE 4 - STANDARD D FLIP-FLOP (MEMORY REGISTER)

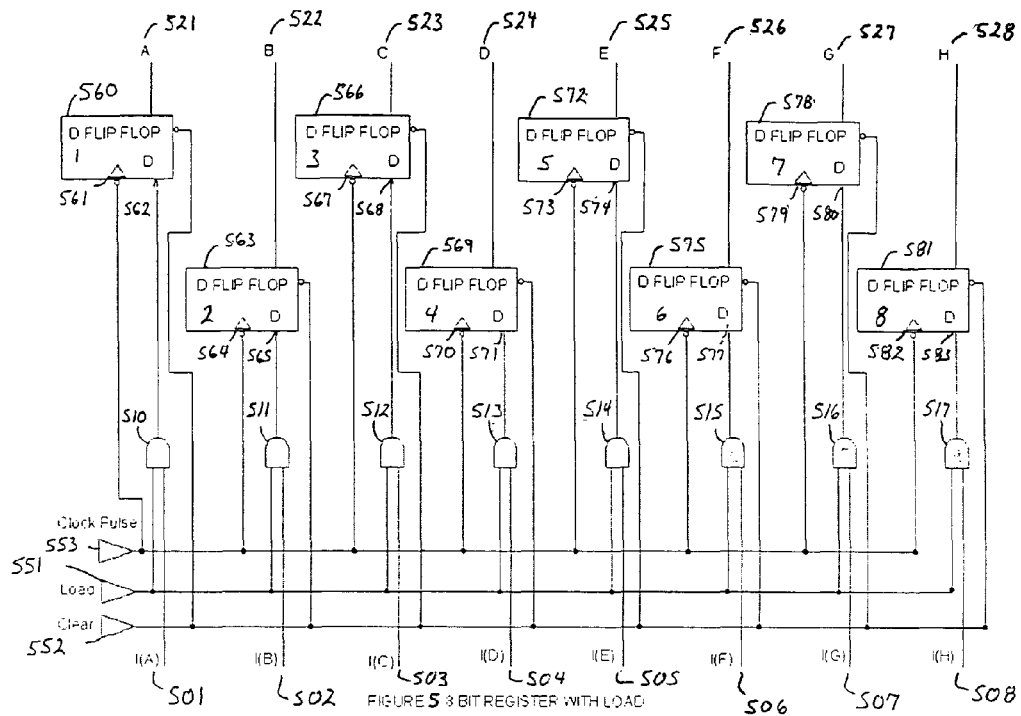
FIGURE 5 - 8 BIT REGISTER WITH LOAD
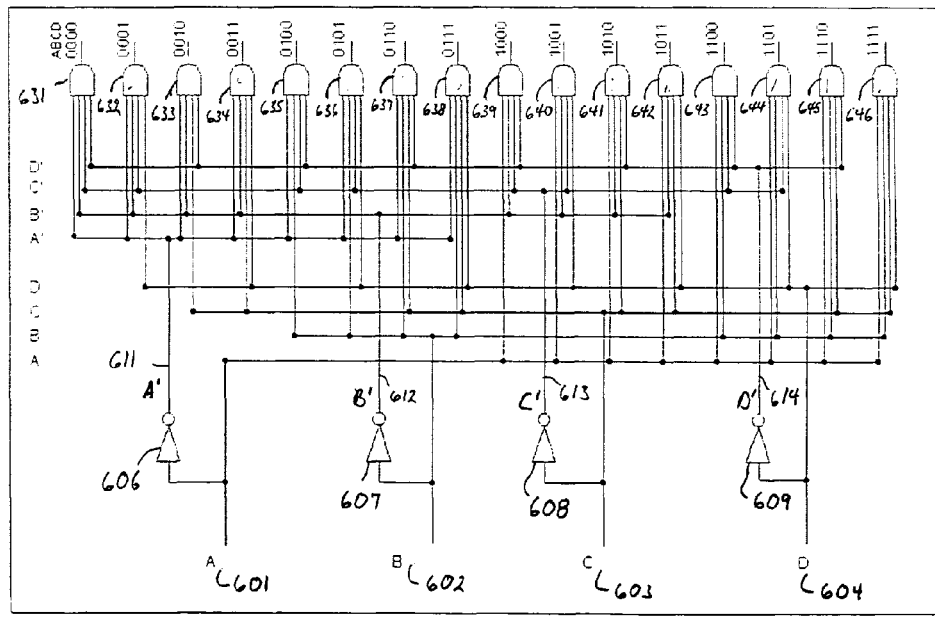
FIGURE 6 - 4 x 16 BIT DECODER

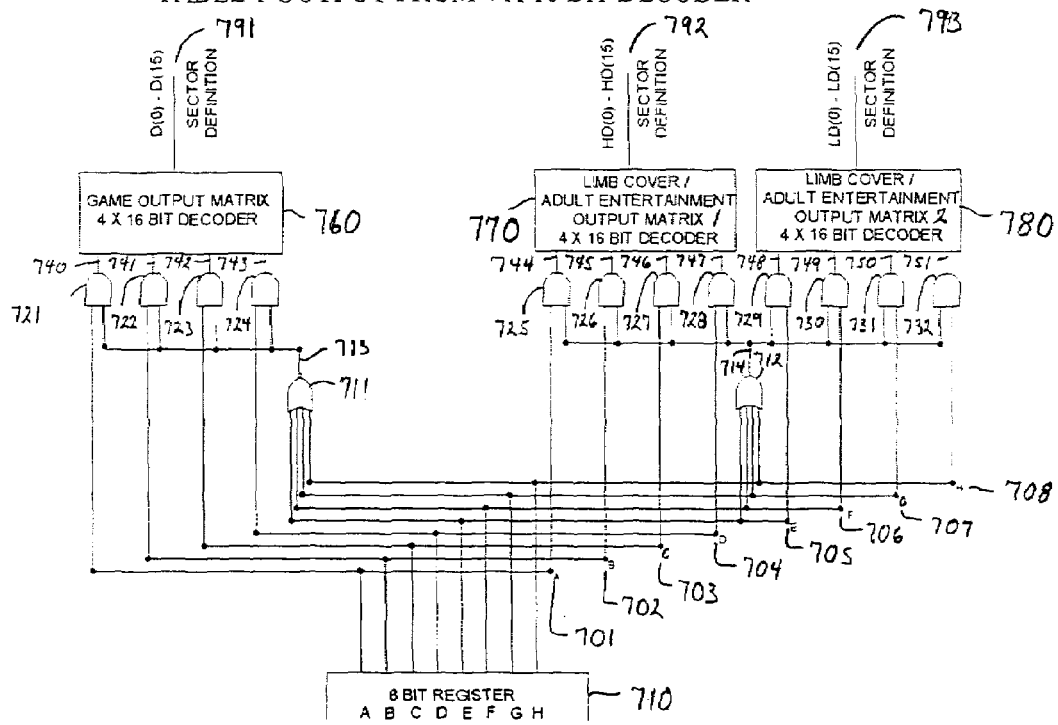
FIGURE 7 DECISION BLOCK GAME MODE / ADULT ENTERTAINMENT MODE / MEDICAL LIMB COVER MODE

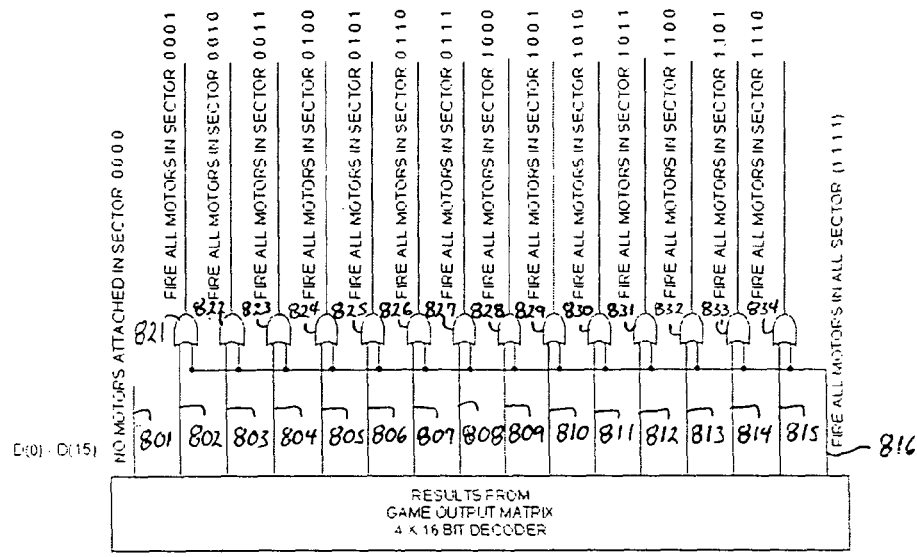
FIGURE 8 RESULTS GAME OUTPUT MATRIX
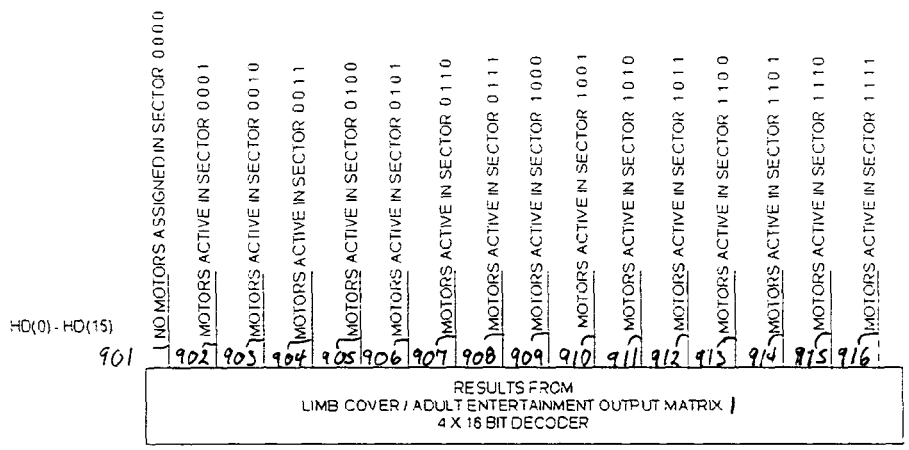
FIGURE 9 RESULTS HIGH ORDER BITS FOR ADULT ENTERTAINMENT AND LIMB COVER OUTPUT MATRIX
| A | B | C | D | SECTOR DEFINITION |
|---|---|---|---|---|
| 0 | 0 | 0 | 0 | NO MOTORS ASSIGNED, USED FOR CLEAR |
| 0 | 0 | 0 | 1 | CHEST SECTOR |
| 0 | 0 | 1 | 0 | BACK SECTOR |
| 0 | 0 | 1 | 1 | LEFT ARM |
| 0 | 1 | 0 | 0 | RIGHT ARM |
| 0 | 1 | 0 | 1 | LEFT LEG |
| 0 | 1 | 1 | 0 | RIGHT LEG |
| 0 | 1 | 1 | 1 | LEFT GLOVE |
| 1 | 0 | 0 | 0 | RIGHT GLOVE |
| 1 | 0 | 0 | 1 | LEFT SOCK |
| 1 | 0 | 1 | 0 | RIGHT SOCK |
| 1 | 0 | 1 | 1 | ADULT ENTERTAINMENT FRONT CROTCH |

| 1 | 1 | 0 | 0 | ADULT ENTERTAINMENT REAR |
|---|---|---|---|---|
| 1 | 1 | 0 | 1 | ADULT ENTERTAINMENT MALE PERIPHERALS |
| 1 | 1 | 1 | 0 | ADULT ENTERTAINMENT FEMALE PERIPHERALS |
| 1 | 1 | 1 | 1 | SECTORS GAME MODE ONLY - FIRE ALL MOTORS IN ALL ADULT ENTERTAINMENT AND MEDICAL MODE – ADDITIONAL MOTORS FOR GROWTH |

TABLE 2 – SECTOR DEFINITION MATRIX

FIGURE 10 RESULTS LOW ORDER BITS FOR ADULT ENTEPTAINMENT AND LIMB COVER OUTPUT MATRIX 2

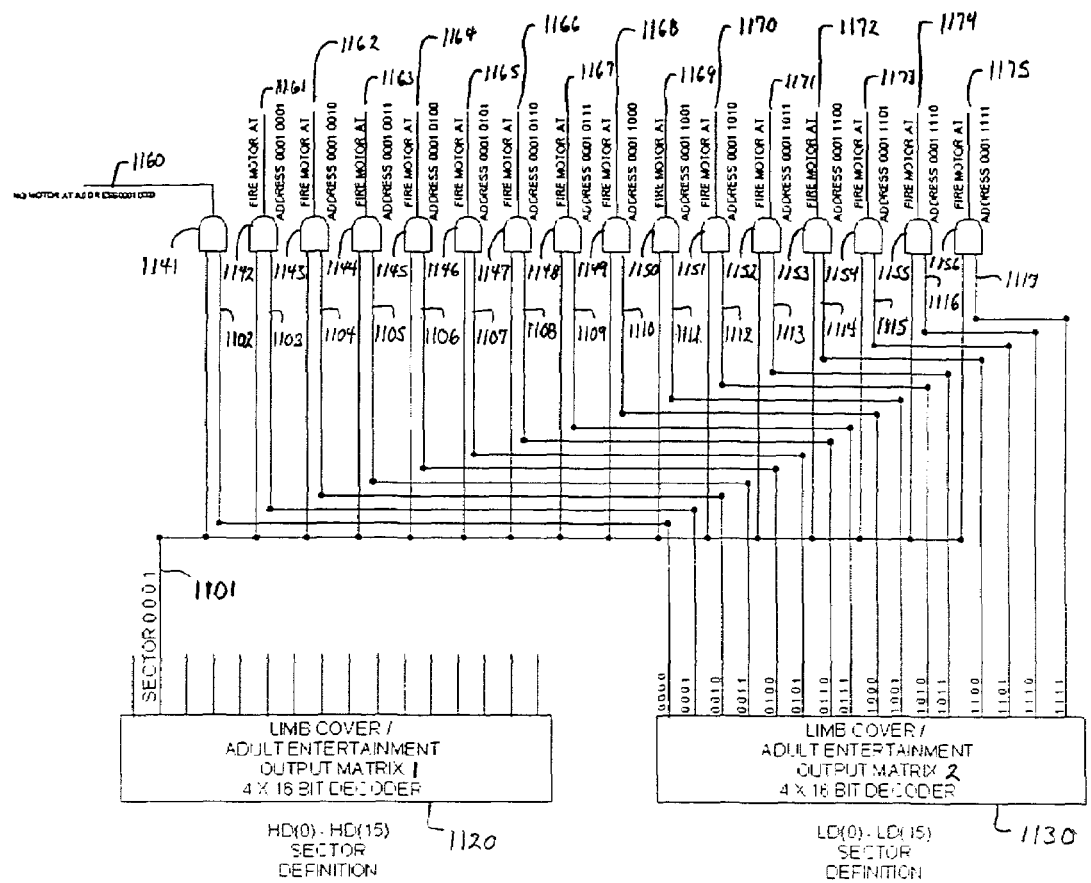
FIGURE 11 ADULT ENTERTAINMENT MODE / MEDICAL LIMB COVER MODE
MOTOR FIRE DECISION MATRIX SECTOR 0001

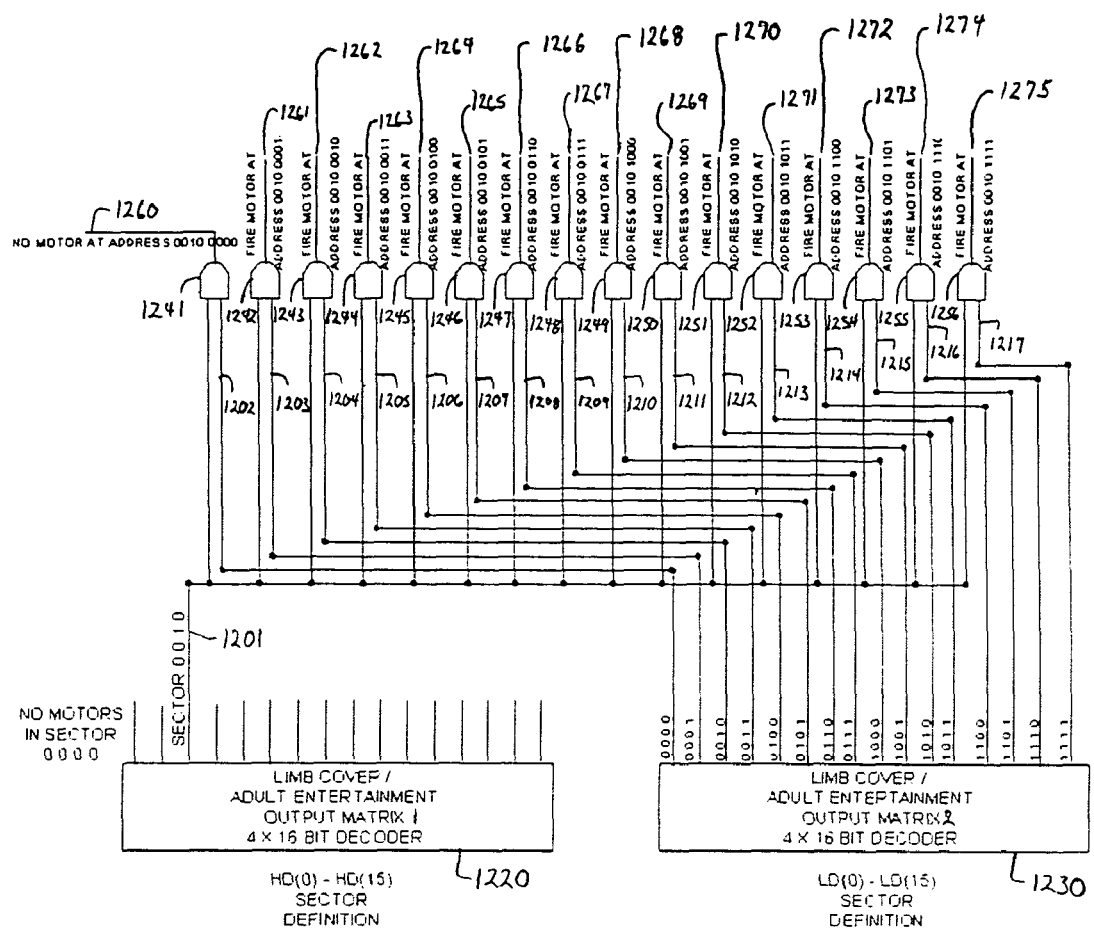
FIGURE 12 ADULT ENTERTAINMENT MODE / MEDICAL LIMB COVER MODE
MOTOR FIRE DECISION MATRIX SECTOR 0010

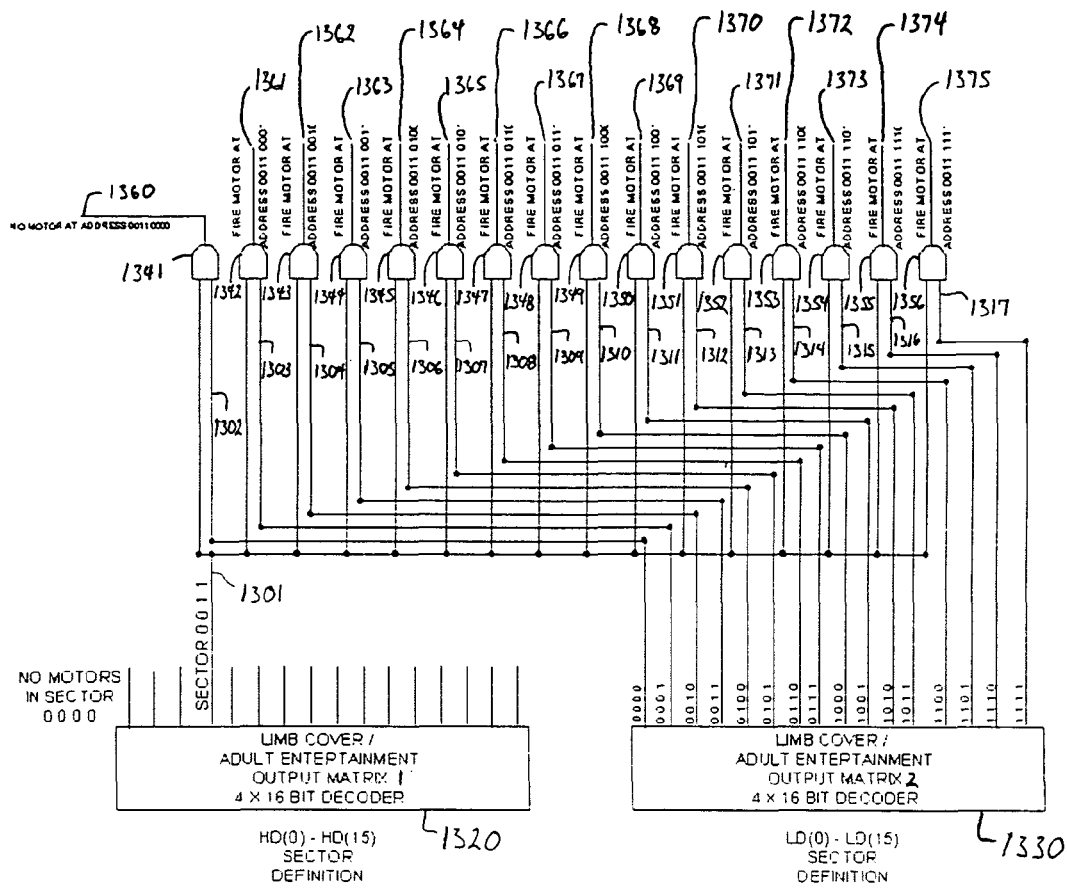
FIGURE 13  ADULT ENTERTAINMENT MODE / MEDICAL LIMB COVER MODE
MOTOR FIRE DECISION MATRIX SECTOR 0 0 1 1

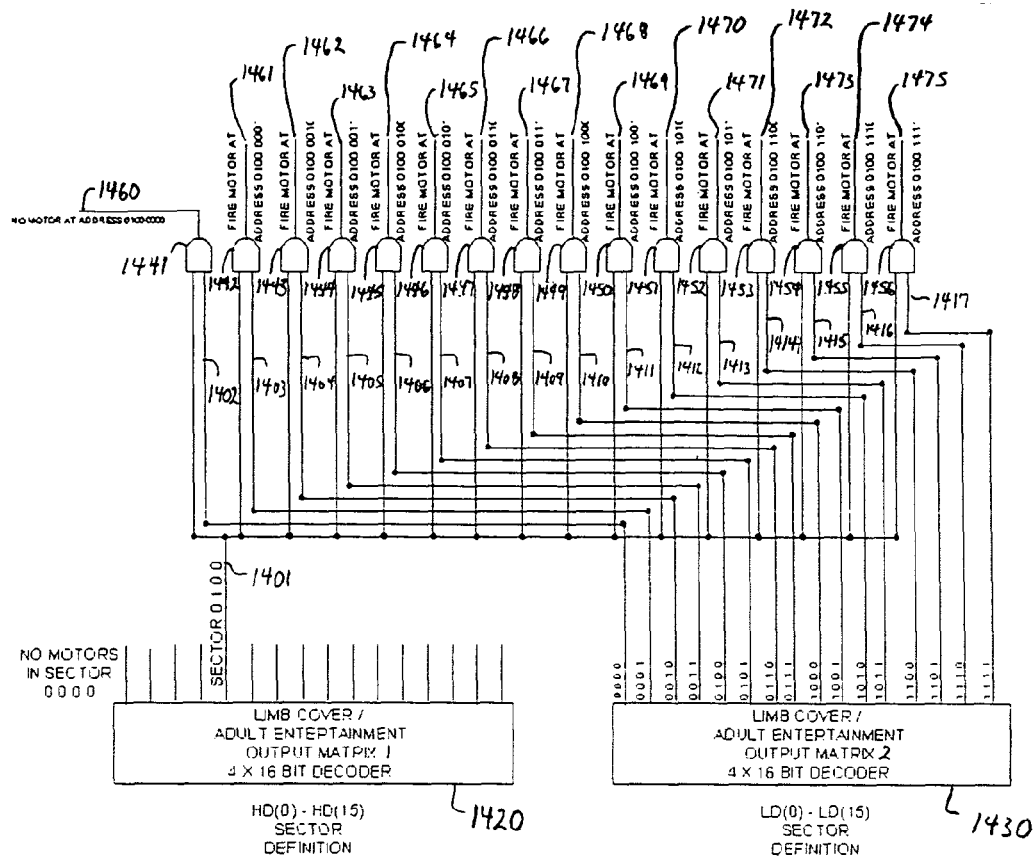
FIGURE 14 ADULT ENTERTAINMENT MODE / MEDICAL LIMB COVER MODE
MOTOR FIRE DECISION MATRIX SECTOR 0 1 0 0
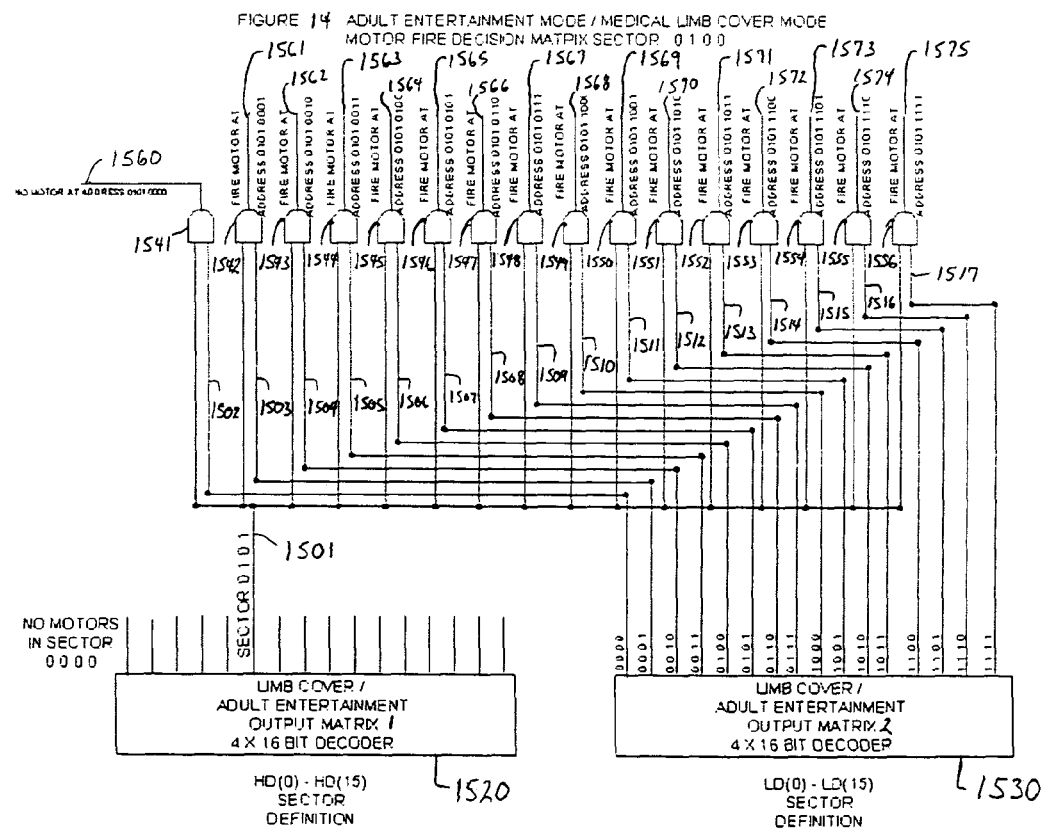
FIGURE 15 ADULT ENTERTAINMENT MODE / MEDICAL LIMB COVER MODE
MOTOR FIRE DECISION MATRIX SECTOR 0 1 0 1

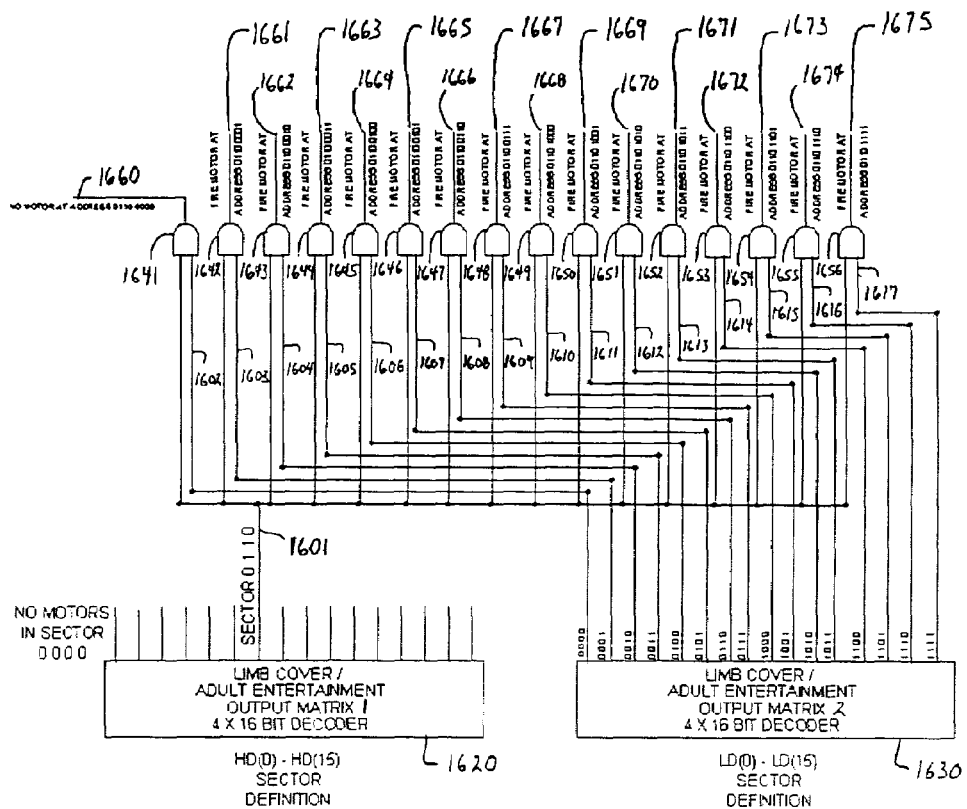
FIGURE 16 ADULT ENTERTAINMENT MODE / MEDICAL LIMB COVER MODE
MOTOR FIRE DECISION MATRIX SECTOR 0 1 1 0
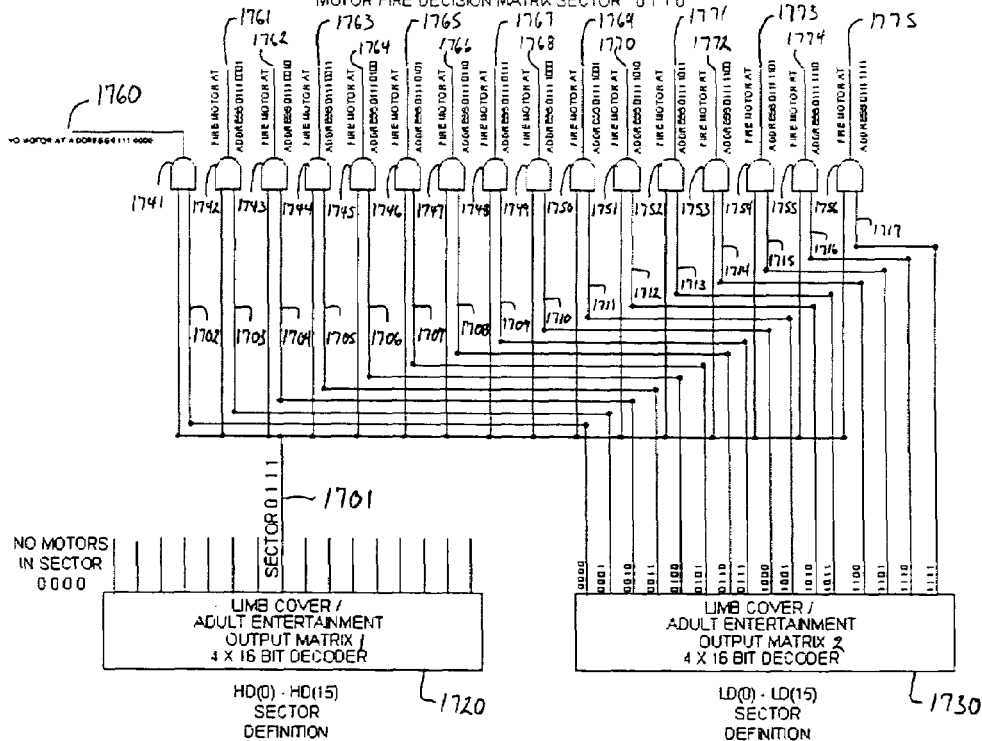
FIGURE 17 ADULT ENTERTAINMENT MODE / MEDICAL LIMB COVER MODE
MOTOR FIRE DECISION MATRIX SECTOR 0 1 1 1

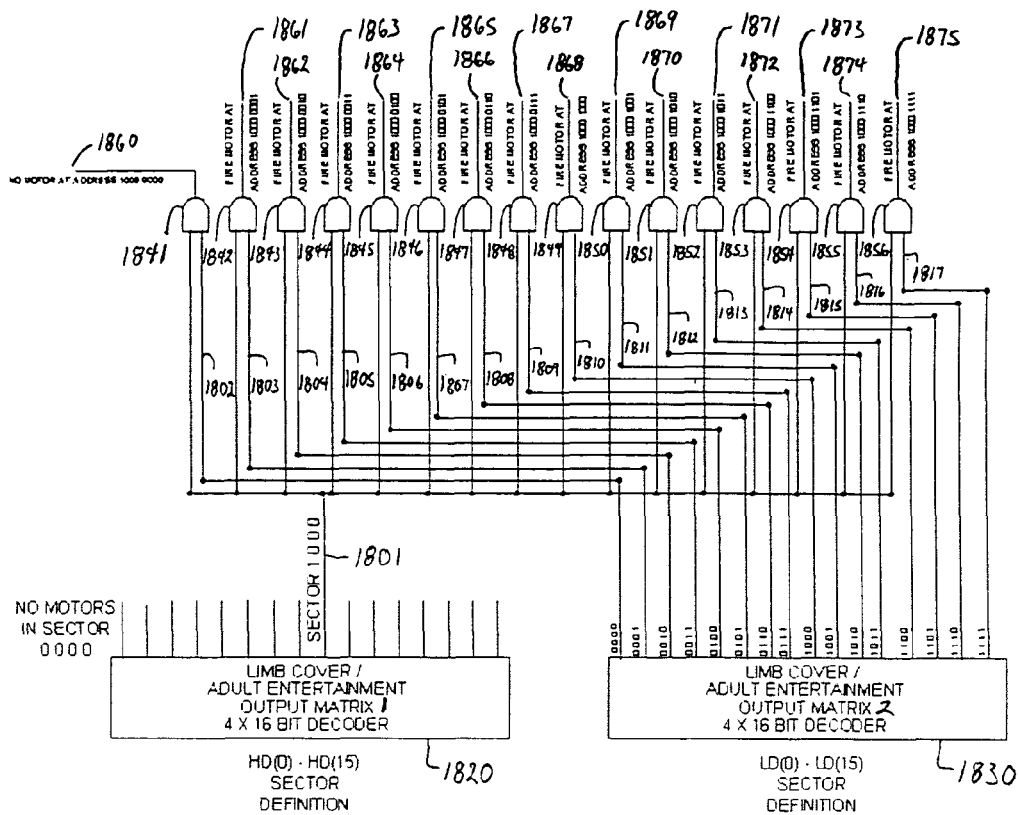
FIGURE 18 ADULT ENTERTAINMENT MODE / MEDICAL LIMB COVER MODE MOTOR FIRE DECISION MATRIX SECTOR 1 0 0 0
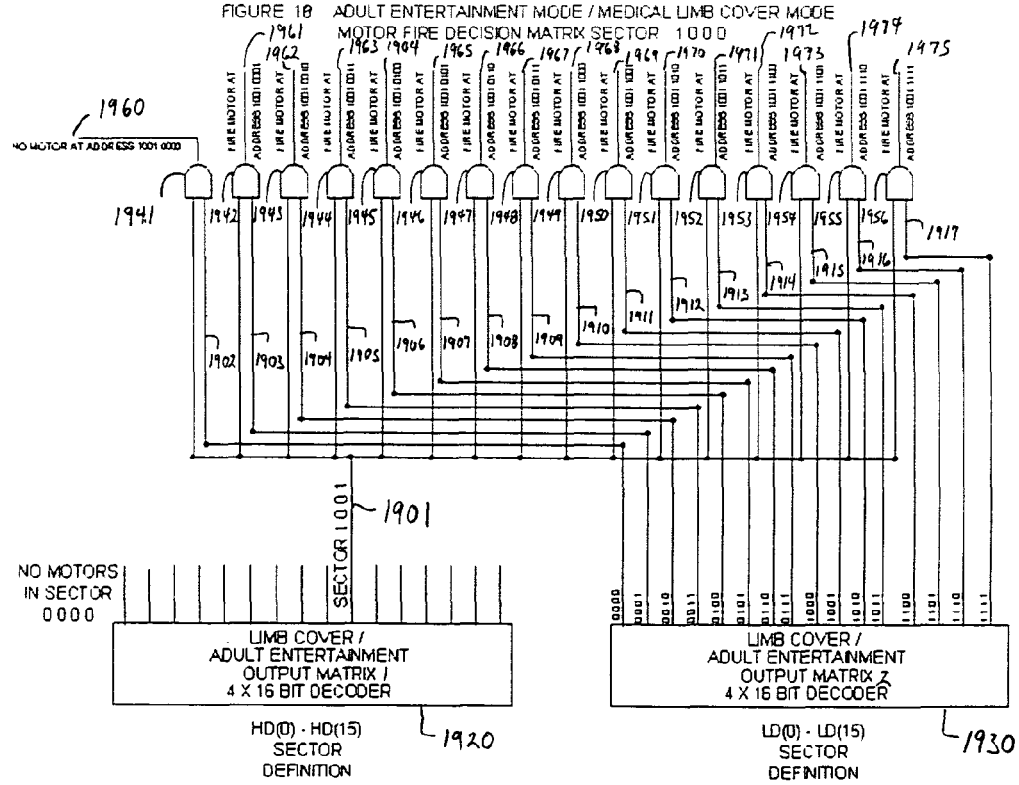
FIGURE 19 ADULT ENTERTAINMENT MODE / MEDICAL LIMB COVER MODE MOTOR FIRE DECISION MATRIX SECTOR 1 0 0 1

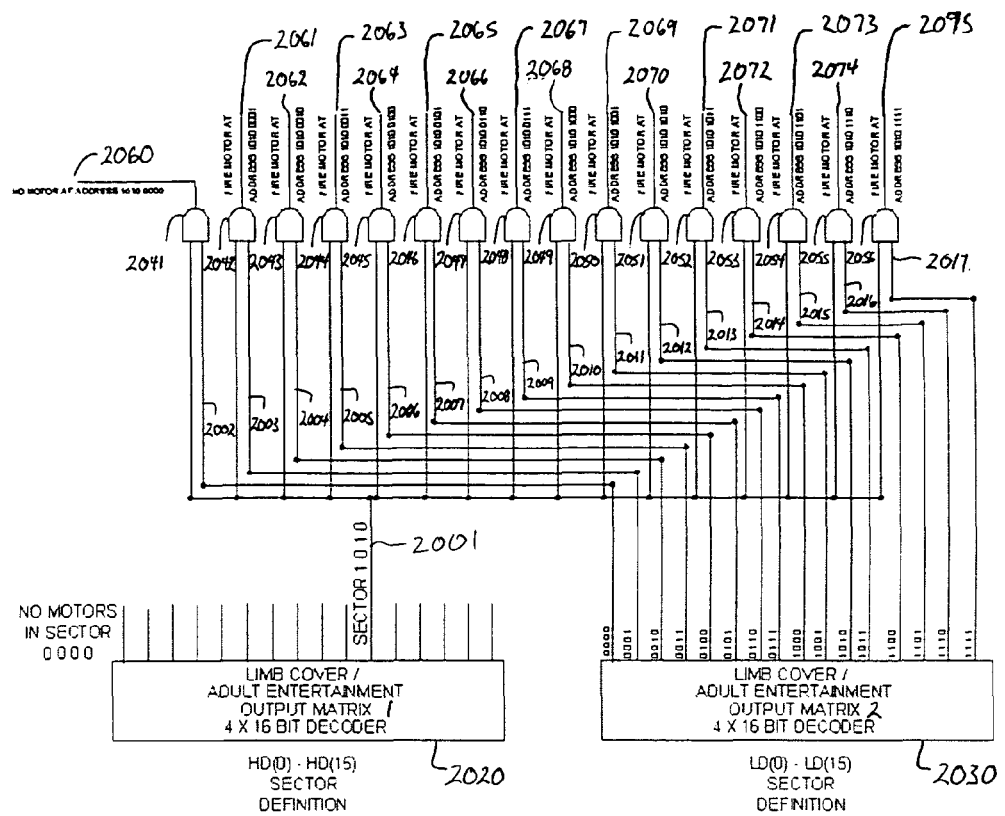
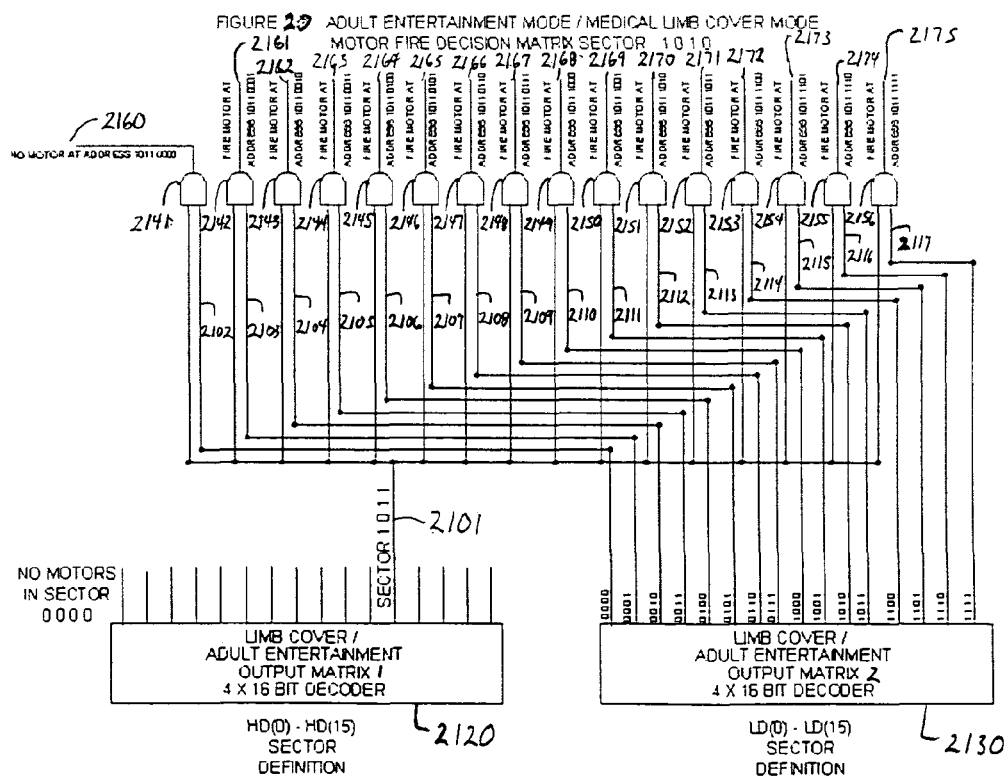
FIGURE 21 ADULT ENTERTAINMENT MODE / MEDICAL LIMB COVER MODE
MOTOR FIRE DECISION MATRIX SECTOR 1 0 1 1

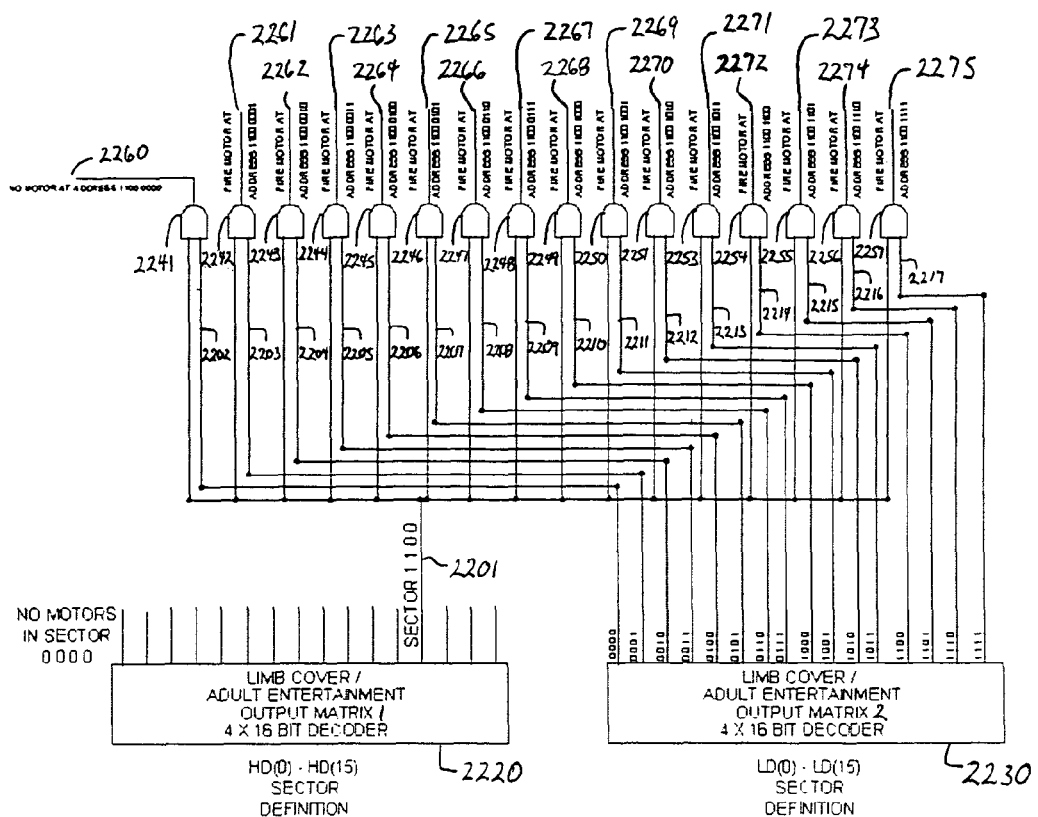
FIGURE 22  ADULT ENTERTAINMENT MODE / MEDICAL LIMB COVER MODE
MOTOR FIRE DECISION MATRIX SECTOR 1100
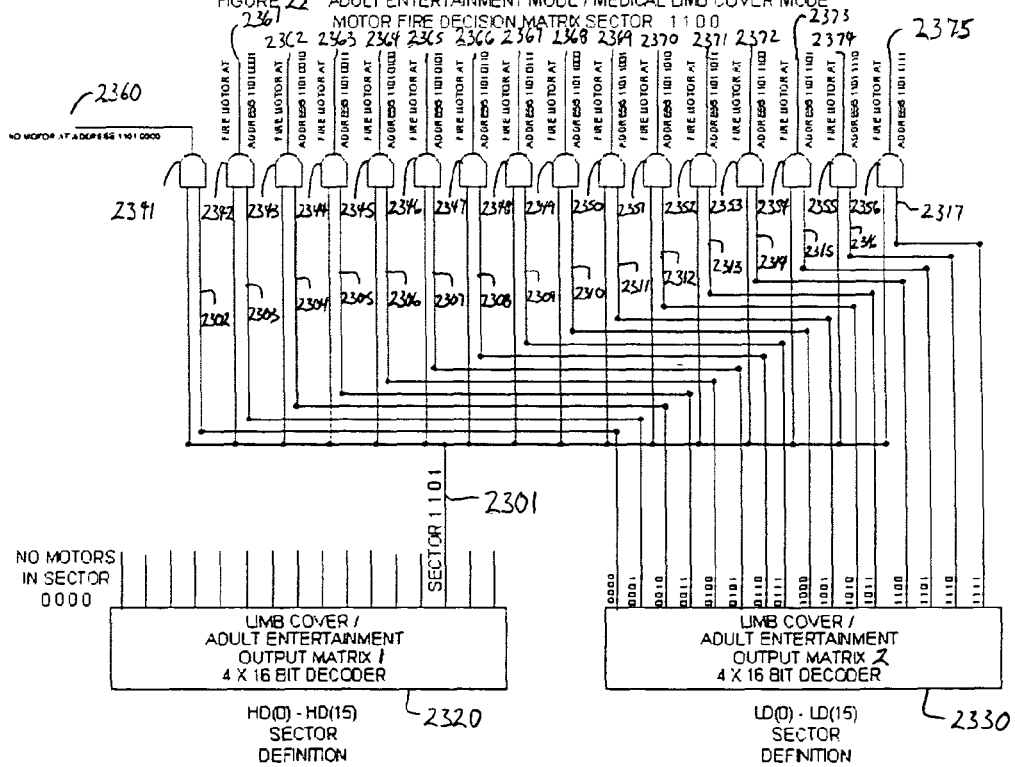
FIGURE 23  ADULT ENTERTAINMENT MODE / MEDICAL LIMB COVER MODE
MOTOR FIRE DECISION MATRIX SECTOR 1101

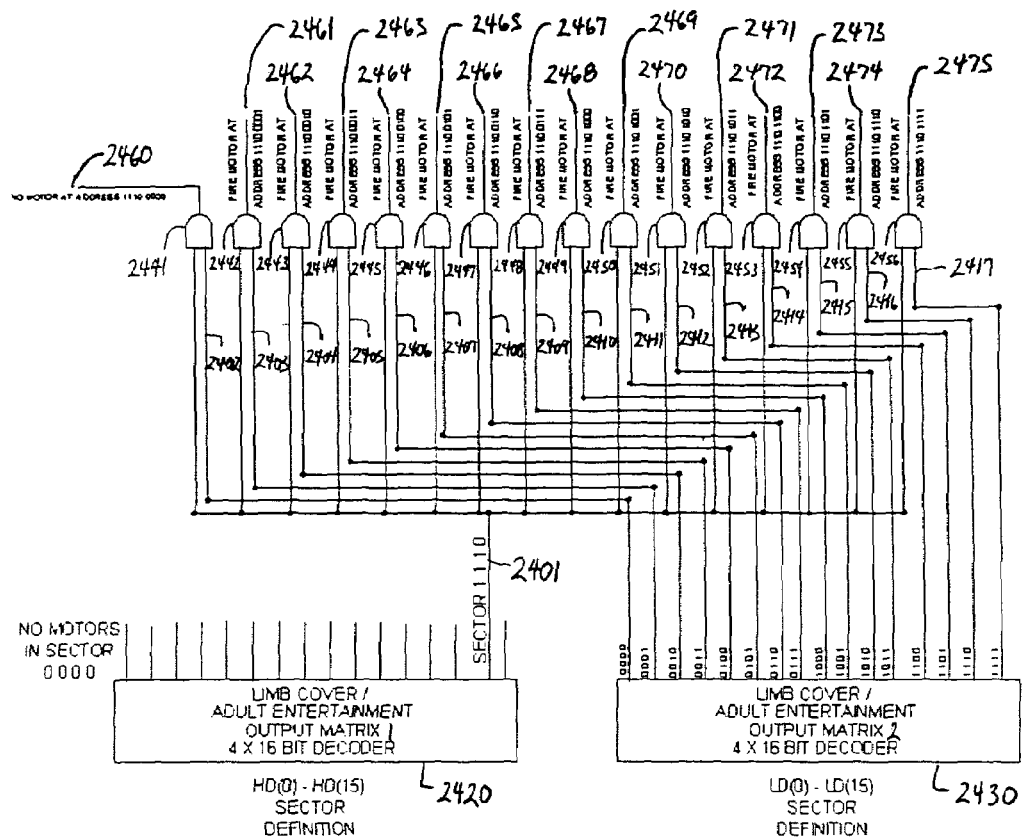
FIGURE 24 ADULT ENTERTAINMENT MODE / MEDICAL UMB COVER MODE
MOTOR FIRE DECISION MATRIX SECTOR 1110
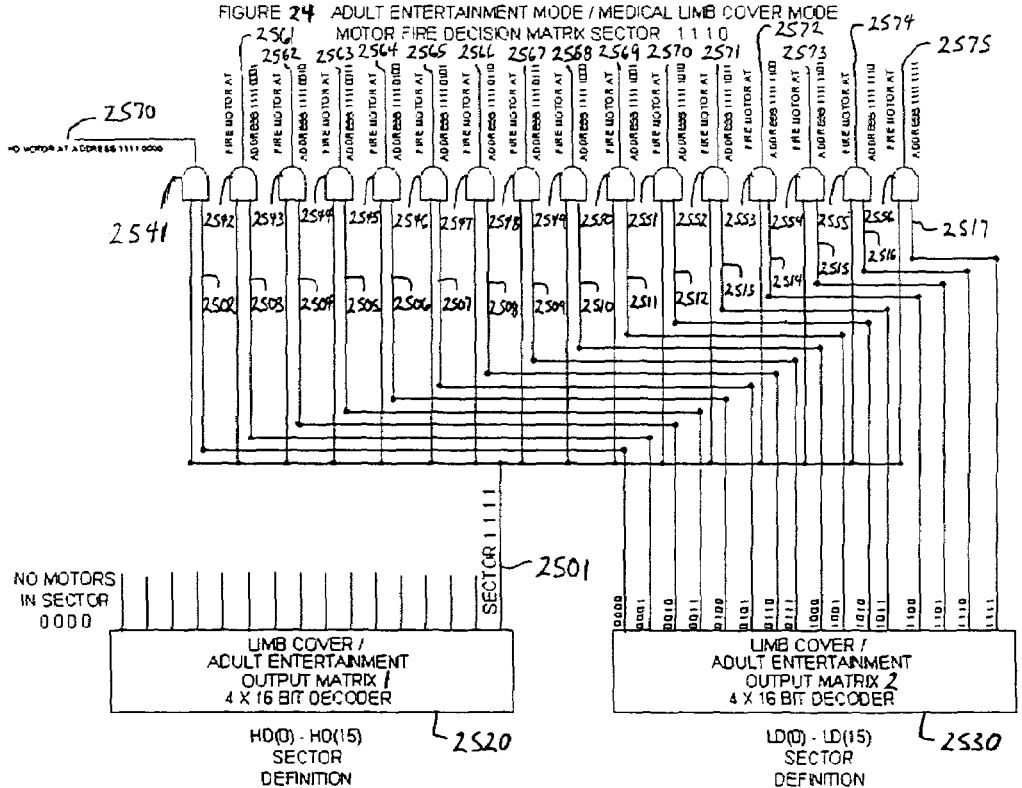
FIGURE 25 ADULT ENTERTAINMENT MODE / MEDICAL UMB COVER MODE
MOTOR FIRE DECISION MATRIX SECTOR 1111

INTERACTIVE BODY SUIT AND INTERACTIVE LIMB COVERS

RELATED APPLICATION DATA

This application is related to a Provisional Patent Application entitled "Interactive Body Suite and Interactive Limb Covers", Ser. No. 60/487,029, filed on Jul. 14, 2003, and priority is claimed for this earlier filing under 35 U.S.C. § 120. The Provisional Patent Application is also incorporated by reference into this utility patent application.

TECHNICAL FIELD OF THE INVENTION

An apparatus for providing a touch sensation in gaming or virtual reality environments.

BACKGROUND OF THE INVENTION

The Internet has produced an explosive growth in numerous markets including gaming, on-line chat, video conferencing, adult entertainment, and medical treatments and information dissemination. The number of users has also exploded with the introduction of various new technologies. As wireless service providers are providing broadband access to the cell phone, fixed line and cable service providers are forced to offer broadband services or be left behind. The deployment of broadband services to homes and individuals has brought about the desire to utilize the greatly increased bandwidth found in broadband.

As applications on wireless communication networks move closer to the Internet, products are being developed that utilize both software and firmware (e.g. microcode). Computer system developers are working to more realistically simulate the virtual world found in computer applications to mimic the real world in a virtual reality. To achieve this simulation and movement to a virtual reality, software, firmware and hardware devices work in tandem to stimulate a persons' senses and create a sensory illusion to match the interactions within the virtual world created by computer programs.

Vision and sound have been readily incorporated by computer systems. Development paths include "virtual reality helmets" that provide a wearer with realistic visual simulations and incorporate headphones to provide both a sight and sound illusion of reality for the computer interface. More simplistic computer screens and speakers do not deliver as effective an illusion of reality. However, though vision and hearing have been incorporated, the other three human senses—touch, smell, taste—have not been as easily simulated to create a virtual reality for the computer user.

The invention utilizes existing platforms and technologies within 3-Dimentional ("3D") virtual reality and links those applications through the Internet with broadband services provided via wire-line or wireless communications networks to provide a physical sensation of touch matching a user's interactions and actions within an Internet or computer driven virtual world or in response to a computer program or device protocol. This allows the user to interact within a virtual, computer generated world by imparting feelings or sensation of impact and touch to whatever actions the user takes within the virtual world.

The invention presents specific application to three vertical markets of gaming, medical, and adult entertainment. Each of these markets possesses a well-established presence on the Internet and established computer-driven applications. Numerous companies offer products that a touch of feeling can enhance the experience provided by the computer-generated frame of reality.

Touch feedback can aid the gaming industry by integrating the player into the game. Players already have the senses of sight and sound stimulated with monitors, virtual reality helmets, speakers, microphones, and headphones. With touch sensation, the player receives feedback corresponding to whatever physical contact the player representation within the game makes.

The invention can also be used within the medical industry. Research is progressing to provide virtual medical care over computer connections. Techniques such as video conferencing are being used along with the transmission of data on vital physical statistics from patients in remote locations to doctors. With the rising cost of medical treatment and the reduction of medical professionals due to the high cost of insurance, the medical industry is boldly seeking innovative ways to reduce cost and provide specialists in needy geographical areas. Virtual doctors and medical care are on the forefront of that research. Computer virtual systems are available or being researched and developed to provide medical training to physicians, medical students, other medical workers, treat patients, and train/educate non-medical individuals.

In training applications, touch feedback can be used by both trainers and trainees to evaluate the correctness of actions being taught. Massage therapy can be provided to an arm or leg peripheral device coupled to a computer or hand-held mobile device. Other treatment options may be implemented, such as drug therapy and, perhaps in the future, surgical or other procedures using remote treatment units or modules. This may be especially useful in remote locations with few medical professionals and limited treatment facilities. Emergency situations, injured military personnel in remote locations, or small ocean craft operating in isolated locations—all far removed from medical help but capable of Internet connections over satellite communication systems—are examples of possible applications.

Additionally, other non-medical applications are possible for this type of touch feedback training simulation. Virtual reality computer programming applications can be extended to simulators for military training. Pilot training, infantry training, armor training, or ship crew training simulators can benefit from integrating a touch feedback.

The invention can also be used for adult entertainment. The Internet, coupled with changing social and sexual norms and an increasing preference for some to select "virtual relations" over riskier real-life liaisons, has driven an explosion of adult material available over the Internet. Within the adult entertainment vertical, touch feedback offers obvious enhancements to the virtual reality offered by the Internet or computer programming.

Adult entertainment is a reality on the Internet that asserts a major economic impact in worldwide economics. AT&T Wireless and Match.com both offer adult community services, and wireless adult services are expected to earn one billion dollars by 2008. Adult entertainment is recognized as a driving force for broadband service expansion in Europe as increasing number of consumers embrace the adult entertainment options available.

SUMMARY OF THE INVENTION

The invention provides a force feedback sense of touch from an object in a virtual world on the Internet or a computer to an individual wearing an interactive body suit, peripherals associated with the interactive body suit, or an interactive limb cover. The interactive body suit comprises a garment that covers the arms, torso, and legs providing a sensation of touch. Peripheral devices such as gloves, socks, and male and female entertainment peripherals will provide the same sensation of touch as the interactive body suit using a motor-mapping methodology.

Small oscillating motors embedded within the body suit and the peripherals create the touch sensation in the invention. A computer connection selectively activates the various motors imbedded throughout the body suit. The interactive body suit, limb covers, and peripherals are driven by a software and firmware set operating through a chip set control interface that translates contacts with objects in the virtual world of a computer program or application into touch sensations simulated by the selectively activated motors.

The motors are organized by body sectors corresponding to a logic address. Because of the greater need for sensing, a number of sensing point within a sector on the interactive body suit will have a single logical address for the adult entertainment and medical interactive devices. For gaming application, coarser sensations are acceptable and rather than specific points, the sectors of the interactive body suit can be activated.

BRIEF DESCRIPTION OF DRAWINGS

The objects and features of the invention will become more readily understood from the following detailed description and appended claims when read in conjunction with the accompanying drawings in which like numerals represent like elements and in which:

FIG. 1 shows an interactive body suit and the location of the communications package and chip set control interface on the suit;

FIG. 2 shows the high level process flow that demonstrates how the interactive body suit and limb cover chip set control interface connect with the motors and the power source;

FIG. 3 shows logic gate tables followed by the hardware design using standard Boolean algebra methodology;

FIG. 4 shows a standard D Flip-Flop or memory latch that responds during the occurrence of a clock pulse or a clear signal;

FIG. 5 shows an 8-bit register with load;

FIG. 6 shows a 4×16-bit decoder;

FIG. 7 show a decision block for evaluation by the hardware;

FIG. 8 shows the output of the Game Output Matrix;

FIG. 9 shows the Results High Order Bits for Adult Entertainment and limb Cover Output Matrix used for adult entertainment applications;

FIG. 10 shows the Results Low Order Bits for Adult Entertainment and Limb Cover Output Matrix used for adult entertainment applications;

FIG. 11 shows the Adult Entertainment Mode/Medical Limb Cover Mode Motor Fire Decision Matrix Sector 0001 that determines the specific motor to activate;

FIG. 12 shows the Adult Entertainment Mode/Medical Limb Cover Mode Motor Fire Decision Matrix Sector 0010 that determines the specific motor to activate;

FIG. 13 shows Adult Entertainment Mode/Medical Limb Cover Mode Motor Fire Decision Matrix Sector 0011 that determines the specific motor to activate;

FIG. 14 shows Adult Entertainment Mode/Medical Limb Cover Mode Motor Fire Decision Matrix Sector 0100 that determines the specific motor to activate;

FIG. 15 shows Adult Entertainment Mode/Medical Limb Cover Mode Motor Fire Decision Matrix Sector 0101 that determines the specific motor to activate;

FIG. 16 shows Adult Entertainment Mode/Medical Limb Cover Mode Motor Fire Decision Matrix Sector 0110 that determines the specific motor to activate;

FIG. 17 shows Adult Entertainment Mode/Medical Limb Cover Mode Motor Fire Decision Matrix Sector 0111 that determines the specific motor to activate;

FIG. 18 shows Adult Entertainment Mode/Medical Limb Cover Mode Motor Fire Decision Matrix Sector 1000 that determines the specific motor to activate;

FIG. 19 shows Adult Entertainment Mode/Medical Limb Cover Mode Motor Fire Decision Matrix Sector 1001 that determines the specific motor to activate;

FIG. 20 shows Adult Entertainment Mode/Medical Limb Cover Mode Motor Fire Decision Matrix Sector 1010 that determines the specific motor to activate;

FIG. 21 shows Adult Entertainment Mode/Medical Limb Cover Mode Motor Fire Decision Matrix Sector 1011 that determines the specific motor to activate;

FIG. 22 shows Adult Entertainment Mode/Medical Limb Cover Mode Motor Fire Decision Matrix Sector 1100 that determines the specific motor to activate;

FIG. 23 shows Adult Entertainment Mode/Medical Limb Cover Mode Motor Fire Decision Matrix Sector 1101 that determines the specific motor to activate;

FIG. 24 shows Adult Entertainment Mode/Medical Limb Cover Mode Motor Fire Decision Matrix Sector 1110 that determines the specific motor to activate;

FIG. 25 shows Adult Entertainment Mode/Medical Limb Cover Mode Motor Fire Decision Matrix Sector 1111 that determines the specific motor to activate.

DETAILED DESCRIPTION OF THE PREFERRED EMBODIMENTS

FIG. 1 shows an interactive body suit 10. The interactive body suit 10 is made from a stretchable material to fit snug on the body. The interactive body suit 10 includes a torso garment 1 that can include integral limb covers 15, or the limb covers 15 can be separate. Other peripherals such as gloves, socks, phallic devices (for women) and personal socks (for men) are also part of the invention. For gaming applications, an interactive torso garment 1, with integral limb covers 15 covering the arms and the legs to above the knees is envisioned. Separate interactive limb covers 15 or other peripherals can be used in adult entertainment or medical applications. Phallic devices for women and personal socks for men are accessories used for adult entertainment applications. The interactive body suit 10 and all accessory products are designed for small, medium, large or extra large sizes for both men and women.

The torso garment 1 includes a chip set control interface 5. The chip set control interface 5 receives input from a number of possible sources including a personal computer (PC) over a Universal Serial Bus (USB) cable connector 7, personal digital assistant (PDA), or cell phone. The communication interface to the interactive body suit 10 can be established by a USB, an infrared, or a Bluetooth chip set interface 5. The accessory products (e.g. limb covers 15, gloves, etc) connect together with the torso garment 1 and through chip set interface 5 to form the interactive body suit 10.

Distributed over the surface of the interactive body suit 10 are small oscillating motors. Each oscillating motor is located within a sector covering a section of the body. Each sector and oscillating motor combination has a unique numeric address location on the body suit 10. These numeric address combinations are Internet Protocol (IP) addressable. That is, an information packet used in Internet communications can be transmitted to activate a specific oscillating motor or group of motors. By combining the IP address and the numeric address of an oscillating motor, individual sections or motors on any given suit may be activated using the Internet or a computer.

FIG. 2 shows the high-level process flow connecting the chip set control interface 5 with motors and a power source. A USB cable 201 connects the computer to an Infrared/Bluetooth interface 205. The Infrared/Bluetooth interface 205 connects to a logic gate chip 215 by communication link 210. The logic gate chip 215 connects to an oscillating motor 225 by link 220. The oscillating motor 225 connects to the positive pole of battery 235 by link 230, and the negative pole of the battery 235 connects to the logic gate chip 215 by link 240, completing an electric circuit to power the oscillating motor 225. The interactive body suit will have the capability to connect to a computer and the Internet through either a USB port to a PC, through infrared connection, or through Bluetooth to hand held devices to activate selected oscillating motors 225. Data inputs through the connection are translated by the logic chip gate 215 control circuitry to activate specified motors 225.

The hardware design of the control circuitry for the body suit follows the standard Boolean algebraic methodology shown in the logic gate legend tables of FIG. 3. The Boolean algebraic expressions have been broken down and expressed in logic symbols and logic diagrams.

The logic symbol for an AND gate 305 is positioned above an AND logic diagram 310 for the AND gate 305. The AND logic diagram 310 shows the output for the possible inputs to the AND gate (e.g. 1 AND 0=0). The logic symbol for a NAND gate 315 is positioned above a NAND logic diagram 320 for the NAND gate 315. The NAND logic diagram 320 shows the output for the possible inputs to the NAND gate (e.g. 1 NAND 0=1). The logic symbol for an OR gate 325 is positioned above a logic diagram 330 for the OR gate 325. The OR logic diagram 330 shows the output for the possible inputs to the OR gate (e.g. 1 OR 0=1). The logic symbol for a NOR gate 335 is positioned above a logic diagram 340 for the NOR gate 335. The NOR logic diagram 340 shows the output for the possible inputs to the NOR gate (e.g. 1 NOR 0=0). The logic symbol for a BUFFER 345 is positioned above a logic diagram 350 for the BUFFER 345. The BUFFER logic diagram 350 shows the output for the possible inputs to the BUFFER 345. The logic symbol for an INVERTER 355 is positioned above a logic diagram 360 for the INVERTER 355. The INVERTER logic diagram 360 shows the output for the possible inputs to the INVERTER 355.

FIG. 4 shows a standard D Flip-Flop logic circuit used to control motor activation in the invention. The logic gate chip 215 used to control activation of the motors uses a standard D Flip-Flop, or memory register, with a clear function in the logic gate chip 215. The D Flip-Flop has a clock input 401 and a data input 402. The clock input 401 is transmitted to two NAND gates. The clock input (C) 401 goes into the first input 407 of NAND gate 406. The clock input 401 also goes into the second input 404 of NAND gate 405.

The other inputs to the two NAND gates are based on a data (D) input 402. The D input 402 is transmitted to the second input 408 of the NAND gate 406. The D input 402 passes through an INVERTER 409 before being input into the first input 403 to NAND gate 405. The output of NAND gate 405 is transmitted to the first input 419 of NAND gate 420. The output of NAND gate 406 is transmitted to the second input 416 of NAND gate 421. The output of NAND gate 420 is defined as Q' 430, and this output is used as the first input 417 to NAND gate 421. The output of NAND gate 421 is defined as Q 440, and this output is used as the second input 418 to NAND gate 420.

The D Flip-Flop is a memory latch that responds to the occurrences of the clock pulse as a clearing signal. Upon receipt of a clock pulse, the D Flip-Flop stores the value passed through the D input 402 into the Q output 440. This value remains constant until the D input 402 changes (to "0" or "1") and the next clock pulse is received to trigger the D Flip-Flop and store the new value Q 440.

FIG. 5 shows an 8-bit register with load. The 8-bit register with load functions as a storage device. A series of D Flip-Flop memory latches store the input from the personal computer, infrared interface, or Bluetooth device. The load input acts to ensure that all 8-bits of the register are loaded simultaneously.

The 8-bit register has eight input signals and eight output signals. Input I(A) 501 is coupled to an input of AND gate 510 with the load input 551 coupled to the AND gate 510 as the other input. Input I(B) 502 is coupled to an input of AND gate 511 with the load signal 551 coupled to the AND gate 511 as the other input. Input I(C) 503 is coupled to an input of AND gate 512 with the load signal 551 coupled to the AND gate 512 as the other input. Input I(D) 504 is coupled to an input of AND gate 513 with the load signal 551 coupled to the AND gate 513 as the other input. Input I(E) 505 is coupled to an input of AND gate 514 with the load signal 551 coupled to the AND gate 514 as the other input. Input I(F) 506 is coupled to an input of AND gate 515 with the load signal 551 coupled to the AND gate 515 as the other input. Input I(G) 507 is coupled to an input of AND gate 516 with the load signal 551 coupled to the AND gate 516 as the other input. Input I(H) 508 is coupled to an input of AND gate 517 with the load signal 551 coupled to the AND gate 517 as the other input.

The output of AND gate 510 is the D input 562 to Flip-Flop 1 560, and the input 561 of the Flip-Flop 1 560 is a clock pulse 553. The output of Flip-Flop 1 560 derived from the two inputs is the A signal 521. The output of AND gate 511 is the D input 565 to Flip-Flop 2 563, and the input 564 of the Flip-Flop 2 563 is a clock pulse 553. The output of Flip-Flop 2 563 derived from the two inputs is the B signal 522. The output of AND gate 512 is the D input 568 to Flip-Flop 3 566, and the input 567 of the Flip-Flop 3 566 is a clock pulse 553. The output of Flip-Flop 3 566 derived from the two inputs is the C signal 523. The output of AND gate 513 is the D input 571 to Flip-Flop 4 569, and the input 570 of the Flip-Flop 4 569 is a clock pulse 553. The output of Flip-Flop 4 569 derived from the two inputs is the D signal 524.

The output of AND gate 514 is the D input 574 to Flip-Flop 5 572, and the input 573 of the Flip-Flop 5 572 is a clock pulse 553. The output of Flip-Flop 5 572 derived from the two inputs is the E signal 525. The output of AND gate 515 is the D input 577 to Flip-Flop 6 575, and the input 576 of the Flip-Flop 6 575 is a clock pulse 553. The output of Flip-Flop 6 575 derived from the two inputs is the F signal 526. The output of AND gate 516 is the D input 580 to Flip-Flop 7 578, and the input 579 of the Flip-Flop 7 578 is a clock pulse 553. The output of Flip-Flop 7 578 derived from the two inputs is the G signal 527. The output of AND gate 517 is the D input 583 to Flip-Flop 8 581, and the input 582 of the Flip-Flop 8 581 is a clock pulse 553. The output of Flip-Flop 8 581 derived from the two inputs is the H signal 528. The 8-bit inputs I(A) 501, I(B) 502, I(C) 503, I(D) 504, I(E) 505, I(F) 506, I(G) 507, and I(H) 508 correspond to specific commands to activate one or more oscillating motors.

FIG. 6 shows a 4×16-bit decoder used in the invention. This 16-bit decoder takes a 4-bit output from the 8-bit register and produces sixteen possible output combinations. The output from the decoder depends on the input from four input signals, and the output will generate only one positive—"1"—output for the possible inputs. Input signal A 601 is connected to the input of an INVERTER 606 and the input to AND gate 639, AND gate 640, AND gate 641, AND gate 642, AND gate 643, AND gate 644, AND gate 645, and AND gate 646. The output of the INVERTER 606 is signal A' 611; the inverse of signal A 601. Signal A' 611 is connected to the input to AND gate 631, AND gate 632, AND gate 633, AND gate 634, AND gate 635, AND gate 636, AND gate 637, and AND gate 638.

Input signal B 602 is connected to the input of an INVERTER 607 and the input to AND gate 635, AND gate 636, AND gate 637, AND gate 638, AND gate 643, AND gate 644, AND gate 645, and AND gate 646. The output of the INVERTER 607 is signal B' 612; the inverse of signal B 602. Signal B' 612 is connected to the input to AND gate 631, AND gate 632, AND gate 633, AND gate 634, AND gate 639, AND gate 640, AND gate 641, and AND gate 642.

Input signal C 603 is connected to the input of an INVERTER 608 and the input to AND gate 633, AND gate 634, AND gate 637, AND gate 638, AND gate 641, AND gate 642, AND gate 645, and AND gate 646. The output of the INVERTER 608 is signal C' 613; the inverse of signal C 603. Signal C' 613 is connected to the input to AND gate 631, AND gate 632, AND gate 635, AND gate 636, AND gate 639, AND gate 640, AND gate 643, and AND gate 644.

Input signal D 604 is connected to the input of an INVERTER 609 and the input to AND gate 632, AND gate 634, AND gate 636, AND gate 638, AND gate 640, AND gate 642, AND gate 644, and AND gate 646. The output of the INVERTER 609 is signal D' 614; the inverse of signal D 604. Signal D' 614 is connected to the input of AND gate 631, AND gate 633, AND gate 635, AND gate 637, AND gate 639, AND gate 641, AND gate 643, and AND gate 645.

Table 1 shows the output of the 4×16-bit decoder. For each possible set of four inputs for signals A 601, B 602, C 603, and D 604 corresponding to a set of "0" or "1" inputs, there is only one set of inputs that yield a "1" result. The 8-bit register's eight outputs can be divided into two 4-bit groups with high order bits A, B, C, and D, and low order bits E, F, G, and H. The 4×16-bit results shown in Table 1 are the same for both groupings of bits.

FIG. 7 shows a decision block used to convert the output from an 8-bit register into command signal inputs for three 4×16-bit decoders to activate motors in the body suit. The output of the 8-bit register is eight output signals (either "0" or "1"), divided into high order bit outputs A, B, C, and D and low order outputs E, F, G, and H.

Output A 701 is an input for AND gate 721 and AND gate 725. Output B 702 is an input for AND gate 722 and AND gate 726. Output C 703 is an input for AND gate 723 and AND gate 727. Output D 704 is an input for AND gate 724 and AND gate 728. Output E 705 is an input to NOR gate 711, OR gate 712, and AND gate 729. Output F 706 is an input to NOR gate 711, OR gate 712, and AND gate 730. Output G 707 is an input to NOR gate 711, OR gate 712, and AND gate 731. Output H 708 is an input to NOR gate 711, OR gate 712, and AND gate 732.

The output 713 of NOR gate 711 is an input to AND gate 721, AND gate 722, AND gate 723, and AND gate 724. The output of AND gate 721 corresponds to input 740 into Game Output Matrix 760. The output of AND gate 722 corresponds to input 741 into Game Output Matrix 760. The output of AND gate 723 corresponds to input 742 into Game Output Matrix 760. The output of AND gate 724 corresponds to input 743 into Game Output Matrix 760. These inputs produce sixteen output signals 791 [D(0)–D(15)] from the Game Output Matrix 760 4×16-bit decoder.

The output 714 of OR gate 712 is an input to AND gate 725, AND gate 726, AND gate 727, AND gate 728, AND gate 729, AND gate 730, AND gate 731, and AND gate 732. The output of AND gate 725 corresponds to input 744 into Limb Cover/Adult Entertainment Output Matrix 1 770. The output of AND gate 726 corresponds to input 745 into Limb Cover/Adult Entertainment Output Matrix 1 770. The output of AND gate 727 corresponds to input 746 into Limb Cover/Adult Entertainment Output Matrix 1 770. The output of AND gate 728 corresponds to input 747 into Limb Cover/Adult Entertainment Output Matrix 1 770. These inputs produce sixteen output signals 792 [HD(0)–HD(15)] from the Limb Cover/Adult Entertainment Output Matrix 1 770 4×16-bit decoder.

The output of AND gate 729 corresponds to input 748 into Limb Cover/Adult Entertainment Output Matrix 2 780. The output of AND gate 730 corresponds to input 749 into Limb Cover/Adult Entertainment Output Matrix 2 780. The output of AND gate 731 corresponds to input 750 into Limb Cover/Adult Entertainment Output Matrix 2 780. The output of AND gate 732 corresponds to input 751 into Limb Cover/Adult Entertainment Output Matrix 2 780. These inputs produce sixteen output signals 793 [LD(0)–LD(15)] from the Limb Cover/Adult Entertainment Output Matrix 2 780 4×16-bit decoder.

Within the decision block, the hardware will evaluate if any of the lower order bits E, F, G and H contain a "1" or if they are all "0". If all of the lower order bits are "0", then the input received from the transmitting device is associated with a game being played. If any of the lower order bits contain a "1", then the input received from the transmitting device is associated with either an adult entertainment input or a medical interactive limb cover. Inputs associated with games will fire all motors within a specified sector, while inputs associated with adult entertainment or medical interactive limb cover applications will fire one motor associated with the logical numeric address of the input.

In the event the application is associated with a game, the high order bits A, B, C, and D are passed into a 4×16 bit decoder in order to identify the sector of the suit to activate. In the event the input is associated with an adult entertainment or medical application, the high order bits A, B, C, and D are passed to a 4×16-bit decoder to identify the sector and the lower order bits E, F, G and H are passed into a 4×16-bit decoder to identify the specific motor within a section to fire.

FIG. 8 shows the results from the Game Output Matrix. The Game Output Matrix outputs will activate all motors in the applicable sector. Each sector is assigned based on the binary-code output from the Game Matrix 4×16-bit decoder. Output D(0) 801 [0000] does not have any motors attached, and this ensures the suit does not activate any motors when a clear signal is passed to the register. Output D(1) 802 [0001] is the input to OR gate 821. Output D(2) 803 [0010] is the input to OR gate 822. Output D(3) 804 [0011] is the input to OR gate 823. Output D(4) 805 [0100] is the input to OR gate 824. Output D(5) 806 [0101] is the input to OR gate 825. Output D(6) 807 [0110] is the input to OR gate 826. Output D(7) 808 [0111] is the input to OR gate 827. Output D(8) 809 [1000] is the input to OR gate 828. Output D(9) 810 [1001] is the input to OR gate 829. Output D(10) 811 [1010] is the input to OR gate 830. Output D(11) 812 [1011] is the input to OR gate 831. Output D(12) 813 [1100] is the input to OR gate 832. Output D(13) 814 [1101] is the input to OR gate 833. Output D(14) 815 [1110] is the input to OR gate 834.

Output D(15) 816 [1111] is the other input to OR gates 821, 822, 823, 824, 825, 826, 827, 828, 829, 830, 831, 832, 833, and 834. The output from D(15) 816 will cause all the sector motors to activate. For the other OR gates, a signal input will activate the motors in that wired sector. For example, if D(4) 805 sends a "1" signal to OR gate 824 corresponding to 0100, the motor assigned to that sector will activate.

FIG. 9 shows the high order results from the Limb Cover/Adult Entertainment Output Matrix 1 associated with bits A, B, C, and D. The Limb Cover/Adult Entertainment Output Matrix 1 outputs will activate motors in the applicable sector. Each assigned sector is based on the binary-code output from the Limb Cover/Adult Entertainment Matrix 1 4×16-bit decoder. Output HD(0) 901 [0000] does not have any motors assigned, and this ensures the suit does not activate any motors when a clear signal is passed to the register.

Output HD(1) 902 [0001] is coupled to (and will activate) motors assigned in sector 0001. Output HD(2) 903 [0010] is coupled to (and will activate) motors assigned in sector 0010. Output HD(3) 904 [0011] is coupled to (and will activate) motors assigned in sector 0011. Output HD(4) 905 [0100] is coupled to (and will activate) motors assigned in sector 0100. Output HD(5) 906 [0101] is coupled to (and will activate) motors assigned in sector 0101. Output HD(6) 907 [0110] is coupled to (and will activate) motors assigned in sector 0110. Output HD(7) 908 [0111] is coupled to (and will activate) motors assigned in sector 0111. Output HD(8) 909 [1000] is coupled to (and will activate) motors assigned in sector 1000. Output HD(9) 910 [1001] is coupled to (and will activate) motors assigned in sector 1001. Output HD(10) 911 [1010] is coupled to (and will activate) motors assigned in sector 1010. Output HD(11) 912 [1011] is coupled to (and will activate) motors assigned in sector 1011. Output HD(12) 913 [1100] is coupled to (and will activate) motors assigned in sector 1100. Output HD(13) 914 [1101] is coupled to (and will activate) motors assigned in sector 1101. Output HD(14) 915 [1110] is coupled to (and will activate) motors assigned in sector 1110. Output HD(15) 916 [1111] is coupled to (and will activate) motors assigned in sector 1111.

Table 2 sets out the sector definition corresponding to the values of ABCD that are generated by the Game Output Matrix and the high order Limb Cover/Adult Entertainment Output Matrix. The chest sector corresponds to 0001. The back sector corresponds to 0010. The left arm corresponds to 0011, and the right arm corresponds to 0100. The left leg corresponds to 0101, and the right leg corresponds to 0110. The left glove corresponds to 0111, and the right glove corresponds to 1000. The left sock corresponds to 1001, and the right sock corresponds to 1010. The adult entertainment front crotch corresponds to 1011. The adult entertainment rear corresponds to 1100. Adult entertainment male peripherals correspond to 1101, and the adult entertainment female peripherals correspond to 1110. For game mode applications, 1111 activates all motors in all sectors. For adult entertainment and medical mode, this output is available for additional growth.

FIG. 10 shows the low order results from the Limb Cover/Adult Entertainment Output Matrix 2. The Limb Cover/Adult Entertainment Output Matrix 2 outputs will activate a specific motor associated with bit E, F, G, and H. Each assigned motor is based on the binary-code output from the Limb Cover/Adult Entertainment Matrix 2 4×16-bit decoder. Output LD(0) 1001 [0000] does not have a motor assigned to this address, and this ensures the suit does not activate a motor when a clear signal is passed to the register.

Output LD(1) 1002 [0001] is coupled to (and will activate) the motor assigned to address 0001. Output LD(2) 1003 [0010] is coupled to (and will activate) the motor assigned to address 0010. Output LD(3) 1004 [0011] is coupled to (and will activate) the motor assigned to address 0011. Output LD(4) 1005 [0100] is coupled to (and will activate) the motor assigned to address 0100. Output LD(5) 1006 [0101] is coupled to (and will activate) the motor assigned to address 0101. Output LD(6) 1007 [0110] is coupled to (and will activate) the motor assigned to address 0001. Output LD(7) 1008 [0111] is coupled to (and will activate) the motor assigned to address 0111. Output LD(8) 1009 [1000] is coupled to (and will activate) the motor assigned to address 1000. Output LD(9) 1010 [1001] is coupled to (and will activate) the motor assigned to address 1001. Output LD(10) 1011 [1010] is coupled to (and will activate) the motor assigned to address 1010. Output LD(11) 1012 [1011] is coupled to (and will activate) the motor assigned to address 1011. Output LD(13) 1013 [1100] is coupled to (and will activate) the motor assigned to address 1100. Output LD(13) 1014 [1101] is coupled to (and will activate) the motor assigned to address 1101. Output LD(14) 1015 [1110] is coupled to (and will activate) the motor assigned to address 1110. LD(15) 1016 [1111] is coupled to (and will activate) the motor assigned to address 1111. Using the low order bits in conjunction with the high order bits, a total of fifteen motors can be assigned to each defined sector.

FIG. 11 shows the configuration for the Adult Entertainment Mode/Medical Limb Cover Mode Motor Fire Decision Matrix for Sector 0001. The specific motor to activate within the body suit can be specified by the output from the high order and low order bits from the two 4×16-bit decoders. The Adult Entertainment Mode/Medical Limb Cover Mode Motor Fire Decision Matrix 1 1120 generates the high order outputs. Output HD 1101 [0001] corresponding to sector 0001 (e.g. the chest) is the first input into a series of AND gates.

The Adult Entertainment Mode/Medical Limb Cover Mode Motor Fire Decision Matrix 2 1130 generates the low order outputs. A positive input from both the high and low order inputs will activate a body suit motor. Output LD(0) 1102 [0000] is the second input to AND gate 1141, and the output 1160 from AND gate 1141 corresponds to address 0001 0000. No motor is assigned to this address to ensure that the suit does not fire any motors when a clear signal is sent to the register.

Output LD(1) 1103 [0001] is the second input to AND gate 1142, and the output 1161 from AND gate 1142 corresponds to address 0001 0001. A positive output 1161 from AND gate 1142 will fire the motor at address 0001 0001. Output LD(2) 1104 [0010] is the second input to AND gate 1143, and the output 1162 from AND gate 1143 corresponds to address 0001 0010. A positive output 1162 from AND gate 1142 will fire the motor at address 0001 0010. Output LD(3) 1105 [0011] is the second input to AND gate 1144, and the output 1163 from AND gate 1144 corresponds to address 0001 0011. A positive output 1163 from AND gate 1144 will fire the motor at address 0001 0011.

Output LD(4) 1106 [0100] is the second input to AND gate 1145, and the output 1164 from AND gate 1145 corresponds to address 0001 0100. A positive output 1164 from AND gate 1145 will fire the motor at address 0001 0100. Output LD(5) 1107 [0101] is the second input to AND gate 1146, and the output 1165 from AND gate 1146 corresponds to address 0001 0101. A positive output 1165 from AND gate 1146 will fire the motor at address 0001 0101. Output LD(6) 1108 [0110] is the second input to AND gate 1147, and the output 1166 from AND gate 1147 corresponds to address 0001 110. A positive output 1166 from AND gate 1147 will fire the motor at address 0001 0110. Output LD(7) 1109 [0111] is the second input to AND gate 1148, and the output 1167 from AND gate 1148 corresponds to address 0001 0111. A positive output 1167 from AND gate 1148 will fire the motor at address 0001 0111.

Output LD(8) 1110 [1000] is the second input to AND gate 1149, and the output 1168 from AND gate 1149 corresponds to address 0001 1000. A positive output 1168 from AND gate 1149 will fire the motor at address 0001 1000. Output LD(9) 1111 [1001] is the second input to AND gate 1150, and the output 1169 from AND gate 1150 corresponds to address 0001 1001. A positive output 1169 from AND gate 1150 will fire the motor at address 0001 1001. Output LD(10) 1112 [1010] is the second input to AND gate 1151, and the output 1170 from AND gate 1151 corresponds to address 0001 1010. A positive output 1170 from AND gate 1151 will fire the motor at address 0001 1010. Output LD(11) 1113 [1011] is the second input to AND gate 1152, and the output 1171 from AND gate 1152 corresponds to address 0001 1011. A positive output 1171 from AND gate 1152 will fire the motor at address 0001 1011.

Output LD(12) 1114 [1100] is the second input to AND gate 1153, and the output 1172 from AND gate 1153 corresponds to address 0001 1100. A positive output 1172 from AND gate 1153 will fire the motor at address 0001 1100. Output LD(13) 1115 [1101] is the second input to AND gate 1154, and the output 1173 from AND gate 1154 corresponds to address 0001 1101. A positive output 1173 from AND gate 1154 will fire the motor at address 0001 1101. Output LD(14) 1116 [1110] is the second input to AND gate 1155, and the output 1174 from AND gate 1155 corresponds to address 0001 1110. A positive output 1174 from AND gate 1155 will fire the motor at address 0001 1110. Output LD(15) 1117 [1111] is the second input to AND gate 1156, and the output 1175 from AND gate 1156 corresponds to address 0001 1111. A positive output 1175 from AND gate 1156 will fire the motor at address 0001 1111.

FIG. 12 shows the configuration for the Adult Entertainment Mode/Medical Limb Cover Mode Motor Fire Decision Matrix for Sector 0010. The specific motor to activate within the body suit can be specified by the output from the high order and low order bits from the two 4×16-bit decoders. The Adult Entertainment Mode/Medical Limb Cover Mode Motor Fire Decision Matrix 1 1220 generates the high order outputs. Output HD 1201 [0010] corresponding to sector 0010 (e.g. the back) is the first input into a series of AND gates.

The Adult Entertainment Mode /Medical Limb Cover Mode Motor Fire Decision Matrix 2 1230 generates the low order outputs. A positive input from both the high and low order inputs will activate a body suit motor. Output LD(0) 1202 [0000] is the second input to AND gate 1241, and the output 1260 from AND gate 1241 corresponds to address 0010 0000. No motor is assigned to this address to ensure that the suit does not fire any motors when a clear signal is sent to the register.

Output LD(1) 1203 [0001] is the second input to AND gate 1242, and the output 1261 from AND gate 1242 corresponds to address 0010 0001. A positive output 1261 from AND gate 1242 will fire the motor at address 0010 0001. Output LD(2) 1204 [0010] is the second input to AND gate 1243, and the output 1262 from AND gate 1243 corresponds to address 0010 0010. A positive output 1262 from AND gate 1243 will fire the motor at address 0010 0010. Output LD(3) 1205 [0011] is the second input to AND gate 1244, and the output 1263 from AND gate 1244 corresponds to address 0010 0011. A positive output 1263 from AND gate 1244 will fire the motor at address 0010 0011.

Output LD(4) 1206 [0100] is the second input to AND gate 1245, and the output 1264 from AND gate 1245 corresponds to address 0010 0100. A positive output 1264 from AND gate 1245 will fire the motor at address 0010 0100. Output LD(5) 1207 [0101] is the second input to AND gate 1246, and the output 1265 from AND gate 1246 corresponds to address 0010 0101. A positive output 1265 from AND gate 1246 will fire the motor at address 0010 0101. Output LD(6) 1208 [0110] is the second input to AND gate 1247, and the output 1266 from AND gate 1247 corresponds to address 0010 0110. A positive output 1266 from AND gate 1247 will fire the motor at address 0010 0110. Output LD(7) 1209 [0111] is the second input to AND gate 1248, and the output 1267 from AND gate 1248 corresponds to address 0010 0111. A positive output 1267 from AND gate 1248 will fire the motor at address 0010 0111.

Output LD(8) 1210 [1000] is the second input to AND gate 1249, and the output 1268 from AND gate 1249 corresponds to address 0010 1000. A positive output 1268 from AND gate 1249 will fire the motor at address 0010 1000. Output LD(9) 1211 [1001] is the second input to AND gate 1250, and the output 1269 from AND gate 1250 corresponds to address 0010 1001. A positive output 1269 from AND gate 1250 will fire the motor at address 0010 1001. Output LD(10) 1212 [1010] is the second input to AND gate 1251, and the output 1270 from AND gate 1251 corresponds to address 0010 1010. A positive output 1270 from AND gate 1251 will fire the motor at address 0010 1010. Output LD(11) 1213 [1011] is the second input to AND gate 1252, and the output 1271 from AND gate 1252 corresponds to address 0010 1011. A positive output 1271 from AND gate 1252 will fire the motor at address 0010 1011.

Output LD(12) 1214 [1100] is the second input to AND gate 1253, and the output 1272 from AND gate 1253 corresponds to address 0010 1100. A positive output 1272 from AND gate 1253 will fire the motor at address 0010 1100. Output LD(13) 1215 [1101] is the second input to AND gate 1254, and the output 1273 from AND gate 1254 corresponds to address 0010 1101. A positive output 1273 from AND gate 1254 will fire the motor at address 0010 1101. Output LD(14) 1216 [1110] is the second input to AND gate 1255, and the output 1274 from AND gate 1255 corresponds to address 0010 1110. A positive output 1274 from AND gate 1255 will fire the motor at address 0010 1110. Output LD(15) 1217 [1111] is the second input to AND gate 1256, and the output 1275 from AND gate 1256 corresponds to address 0010 1111. A positive output 1275 from AND gate 1256 will fire the motor at address 0010 1111.

FIG. 13 shows the configuration for the Adult Entertainment Mode/Medical Limb Cover Mode Motor Fire Decision Matrix for Sector 0011. The specific motor to activate within the body suit can be specified by the output from the high order and low order bits from the two 4×16-bit decoders. The Adult Entertainment Mode/Medical Limb Cover Mode Motor Fire Decision Matrix 1 1320 generates the high order outputs. Output HD 1301 [0011] corresponding to sector 0011 (e.g. the left arm) is input into a series of AND gates.

The Adult Entertainment Mode/Medical Limb Cover Mode Motor Fire Decision Matrix 2 1330 generates the low order outputs. A positive input from both the high and low order inputs will activate a body suit motor. Output LD(0) 1302 [0000] is the second input to AND gate 1341, and the output 1360 from AND gate 1341 corresponds to address 0011 0000. No motor is assigned to this address to ensure that the suit does not fire any motors when a clear signal is sent to the register.

Output LD(1) 1303 [0001] is the second input to AND gate 1342, and the output 1361 from AND gate 1342 corresponds to address 0011 0001. A positive output 1361 from AND gate 1342 will fire the motor at address 0011 0001. Output LD(2) 1304 [0010] is the second input to AND gate 1343, and the output 1362 from AND gate 1343 corresponds to address 0011 0010. A positive output 1362 from AND gate 1343 will fire the motor at address 0011 0010. Output LD(3) 1305 [0011] is the second input to AND gate 1344, and the output 1363 from AND gate 1344 corresponds to address 0011 0011. A positive output 1363 from AND gate 1344 will fire the motor at address 0011 0011.

Output LD(4) 1306 [0100] is the second input to AND gate 1345, and the output 1364 from AND gate 1345 corresponds to address 0011 0100. A positive output 1364 from AND gate 1345 will fire the motor at address 0011 0100. Output LD(5) 1307 [0101] is the second input to AND gate 1346, and the output 1365 from AND gate 1346 corresponds to address 0011 0101. A positive output 1365 from AND gate 1346 will fire the motor at address 0011 0101. Output LD(6) 1308 [0110] is the second input to AND gate 1347, and the output 1366 from AND gate 1347 corresponds to address 0011 0110. A positive output 1366 from AND gate 1347 will fire the motor at address 0011 0110. Output LD(7) 1309 [0111] is the second input to AND gate 1348, and the output 1367 from AND gate 1348 corresponds to address 0011 0111. A positive output 1367 from AND gate 1348 will fire the motor at address 0011 0111.

Output LD(8) 1310 [1000] is the second input to AND gate 1349, and the output 1368 from AND gate 1349 corresponds to address 0011 1000. A positive output 1368 from AND gate 1349 will fire the motor at address 0011 1000. Output LD(9) 1311 [1001] is the second input to AND gate 1350, and the output 1369 from AND gate 1350 corresponds to address 0011 1001. A positive output 1369 from AND gate 1350 will fire the motor at address 0011 1001. Output LD(10) 1312 [1010] is the second input to AND gate 1351, and the output 1370 from AND gate 1351 corresponds to address 0011 1010. A positive output 1370 from AND gate 1351 will fire the motor at address 0011 1010. Output LD(11) 1313 [1011] is the second input to AND gate 1352, and the output 1371 from AND gate 1352 corresponds to address 0011 1011. A positive output 1371 from AND gate 1352 will fire the motor at address 0011 1011.

Output LD(12) 1314 [1100] is the second input to AND gate 1353, and the output 1372 from AND gate 1353 corresponds to address 0011 1100. A positive output 1372 from AND gate 1353 will fire the motor at address 0011 1100. Output LD(13) 1315 [1101] is the second input to AND gate 1354, and the output 1373 from AND gate 1354 corresponds to address 0011 1101. A positive output 1373 from AND gate 1354 will fire the motor at address 0011 1101. Output LD(14) 1316 [1110] is the second input to AND gate 1355, and the output 1374 from AND gate 1355 corresponds to address 0011 1110. A positive output 1374 from AND gate 1355 will fire the motor at address 0011 1110. Output LD(15) 1317 [1111] is the second input to AND gate 1356, and the output 1375 from AND gate 1356 corresponds to address 0011 1111. A positive output 1375 from AND gate 1356 will fire the motor at address 0011 1111.

FIG. 14 shows the configuration for the Adult Entertainment Mode/Medical Limb Cover Mode Motor Fire Decision Matrix for Sector 0100. The specific motor to activate within the body suit can be specified by the output from the high order and low order bits from the two 4×16-bit decoders. The Adult Entertainment Mode/Medical Limb Cover Mode Motor Fire Decision Matrix 1 1420 generates the high order outputs. Output HD 1401 [0100] corresponding to sector 0100 (e.g. the right arm) is the first input into a series of AND gates.

The Adult Entertainment Mode/Medical Limb Cover Mode Motor Fire Decision Matrix 2 1430 generates the low order outputs. A positive input from both the high and low order inputs will activate a body suit motor. Output LD(0) 1402 [0000] is the second input to AND gate 1441, and the output 1460 from AND gate 1441 corresponds to address 0100 0000. No motor is assigned to this address to ensure that the suit does not fire any motors when a clear signal is sent to the register.

Output LD(1) 1403 [0001] is the second input to AND gate 1442, and the output 1461 from AND gate 1442 corresponds to address 0100 0001. A positive output 1461 from AND gate 1442 will fire the motor at address 0100 0001. Output LD(2) 1404 [0010] is the second input to AND gate 1443, and the output 1462 from AND gate 1443 corresponds to address 0100 0010. A positive output 1462 from AND gate 1443 will fire the motor at address 0100 0010. Output LD(3) 1405 [0011] is the second input to AND gate 1444, and the output 1463 from AND gate 1444 corresponds to address 0100 0011. A positive output 1463 from AND gate 1444 will fire the motor at address 0100 0011.

Output LD(4) 1406 [0100] is the second input to AND gate 1445, and the output 1464 from AND gate 1445 corresponds to address 0100 0100. A positive output 1464 from AND gate 1445 will fire the motor at address 0100 0100. Output LD(5) 1407 [0101] is the second input to AND gate 1446, and the output 1465 from AND gate 1446 corresponds to address 0100 0101. A positive output 1465 from AND gate 1446 will fire the motor at address 0100 0101. Output LD(6) 1408 [0110] is the second input to AND gate 1447, and the output 1466 from AND gate 1447 corresponds to address 0100 0110. A positive output 1466 from AND gate 1447 will fire the motor at address 0100 0110. Output LD(7) 1409 [0111] is the second input to AND gate 1448, and the output 1467 from AND gate 1448 corresponds to address 0100 0111. A positive output 1467 from AND gate 1448 will fire the motor at address 0100 0111.

Output LD(8) 1410 [1000] is the second input to AND gate 1449, and the output 1468 from AND gate 1449 corresponds to address 0100 1000. A positive output 1468 from AND gate 1449 will fire the motor at address 0100 1000. Output LD(9) 1411 [1001] is the second input to AND gate 1450, and the output 1469 from AND gate 1450 corresponds to address 0100 1001. A positive output 1469 from AND gate 1450 will fire the motor at address 0100 1001. Output LD(10) 1412 [1010] is the second input to AND gate 1451, and the output 1470 from AND gate 1451 corresponds to address 0100 1010. A positive output 1470 from AND gate 1451 will fire the motor at address 0100 1010. Output LD(11) 1413 [1011] is the second input to AND gate 1452, and the output 1471 from AND gate 1452 corresponds to address 0100 1011. A positive output 1471 from AND gate 1452 will fire the motor at address 0100 1011.

Output LD(12) 1414 [1100] is the second input to AND gate 1453, and the output 1472 from AND gate 1453 corresponds to address 0100 1100. A positive output 1472 from AND gate 1453 will fire the motor at address 0100 1100. Output LD(13) 1415 [1101] is the second input to AND gate 1454, and the output 1473 from AND gate 1454 corresponds to address 0100 1101. A positive output 1473 from AND gate 1454 will fire the motor at address 0100 1101. Output LD(14) 1416 [1110] is the second input to AND gate 1455, and the output 1474 from AND gate 1455 corresponds to address 0100 1110. A positive output 1474 from AND gate 1455 will fire the motor at address 0100 1110. Output LD(15) 1417 [1111] is the second input to AND gate 1456, and the output 1475 from AND gate 1456 corresponds to address 0100 1111. A positive output 1475 from AND gate 1456 will fire the motor at address 0100 1111.

FIG. 15 shows the configuration for the Adult Entertainment Mode/Medical Limb Cover Mode Motor Fire Decision Matrix for Sector 0101. The specific motor to activate within the body suit can be specified by the output from the high order and low order bits from the two 4×16-bit decoders. The Adult Entertainment Mode/Medical Limb Cover Mode Motor Fire Decision Matrix 1 1520 generates the high order outputs. Output HD 1501 [0101] corresponding to sector 0101 (e.g. the left leg) is the first input into a series of AND gates.

The Adult Entertainment Mode/Medical Limb Cover Mode Motor Fire Decision Matrix 2 1530 generates the low order outputs. A positive input from both the high and low order inputs will activate a body suit motor. Output LD(0) 1502 [0000] is the second input to AND gate 1541, and the output 1560 from AND gate 1541 corresponds to address 0101 0000. No motor is assigned to this address to ensure that the suit does not fire any motors when a clear signal is sent to the register.

Output LD(1) 1503 [0001] is the second input to AND gate 1542, and the output 1561 from AND gate 1542 corresponds to address 0101 0001. A positive output 1561 from AND gate 1542 will fire the motor at address 0101 0001. Output LD(2) 1504 [0010] is the second input to AND gate 1543, and the output 1562 from AND gate 1543 corresponds to address 0101 0010. A positive output 1562 from AND gate 1543 will fire the motor at address 0101 0010. Output LD(3) 1505 [0011] is the second input to AND gate 1544, and the output 1563 from AND gate 1544 corresponds to address 0101 0011. A positive output 1563 from AND gate 1544 will fire the motor at address 0101 0011.

Output LD(4) 1506 [0100] is the second input to AND gate 1545, and the output 1564 from AND gate 1545 corresponds to address 0101 0100. A positive output 1564 from AND gate 1545 will fire the motor at address 0101 0100. Output LD(5) 1507 [0101] is the second input to AND gate 1546, and the output 1565 from AND gate 1546 corresponds to address 0101 0101. A positive output 1565 from AND gate 1546 will fire the motor at address 0101 0101. Output LD(6) 1508 [0110] is the second input to AND gate 1547, and the output 1566 from AND gate 1547 corresponds to address 0101 0110. A positive output 1566 from AND gate 1547 will fire the motor at address 0101 0110. Output LD(7) 1509 [0111] is the second input to AND gate 1548, and the output 1567 from AND gate 1548 corresponds to address 0101 0111. A positive output 1567 from AND gate 1548 will fire the motor at address 0101 0111.

Output LD(8) 1510 [1000] is the second input to AND gate 1549, and the output 1568 from AND gate 1549 corresponds to address 0101 1000. A positive output 1568 from AND gate 1549 will fire the motor at address 0101 1000. Output LD(9) 1511 [1001] is the second input to AND gate 1550, and the output 1569 from AND gate 1550 corresponds to address 0101 1001. A positive output 1569 from AND gate 1550 will fire the motor at address 0101 1001. Output LD(10) 1512 [1010] is the second input to AND gate 1551, and the output 1570 from AND gate 1551 corresponds to address 0101 1010. A positive output 1570 from AND gate 1551 will fire the motor at address 0101 1010. Output LD(11) 1513 [1011] is the second input to AND gate 1552, and the output 1571 from AND gate 1552 corresponds to address 0101 1011. A positive output 1571 from AND gate 1552 will fire the motor at address 0101 1011.

Output LD(12) 1514 [1100] is the second input to AND gate 1553, and the output 1572 from AND gate 1553 corresponds to address 0101 1100. A positive output 1572 from AND gate 1553 will fire the motor at address 0101 1100. Output LD(13) 1515 [1101] is the second input to AND gate 1554, and the output 1573 from AND gate 1554 corresponds to address 0101 1101. A positive output 1573 from AND gate 1554 will fire the motor at address 0101 1101. Output LD(14) 1516 [1110] is the second input to AND gate 1555, and the output 1574 from AND gate 1555 corresponds to address 0101 1110. A positive output 1574 from AND gate 1555 will fire the motor at address 0101 1110. Output LD(15) 1517 [1111] is the second input to AND gate 1556, and the output 1575 from AND gate 1556 corresponds to address 0101 1111. A positive output 1575 from AND gate 1556 will fire the motor at address 0101 1111.

FIG. 16 shows the configuration for the Adult Entertainment Mode/Medical Limb Cover Mode Motor Fire Decision Matrix for Sector 0110. The specific motor to activate within the body suit can be specified by the output from the high order and low order bits from the two 4×16-bit decoders. The Adult Entertainment Mode/Medical Limb Cover Mode Motor Fire Decision Matrix 1 1620 generates the high order outputs. Output HD 1601 [0110] corresponding to sector 0110 (e.g. the right leg) is the first input into a series of AND gates.

The Adult Entertainment Mode/Medical Limb Cover Mode Motor Fire Decision Matrix 2 1630 generates the low order outputs. A positive input from both the high and low order inputs will activate a body suit motor. Output LD(0) 1602 [0000] is the second input to AND gate 1641, and the output 1660 from AND gate 1641 corresponds to address 0110 0000. No motor is assigned to this address to ensure that the suit does not fire any motors when a clear signal is sent to the register.

Output LD(1) 1603 [0001] is the second input to AND gate 1642, and the output 1661 from AND gate 1642 corresponds to address 0110 0001. A positive output 1661 from AND gate 1642 will fire the motor at address 0110 0001. Output LD(2) 1604 [0010] is the second input to AND gate 1643, and the output 1662 from AND gate 1643 corresponds to address 0110 0010. A positive output 1662 from AND gate 1644 will fire the motor at address 0110 0010. Output LD(3) 1605 [0011] is the second input to AND gate 1644, and the output 1663 from AND gate 1644 corresponds to address 0110 0011. A positive output 1663 from AND gate 1644 will fire the motor at address 0110 0011.

Output LD(4) 1606 [0100] is the second input to AND gate 1645, and the output 1664 from AND gate 1645 corresponds to address 0110 0100. A positive output 1664 from AND gate 1645 will fire the motor at address 0110 0100. Output LD(5) 1607 [0101] is the second input to AND gate 1646, and the output 1665 from AND gate 1646 corresponds to address 0110 0101. A positive output 1665 from AND gate 1646 will fire the motor at address 0110 0101. Output LD(6) 1608 [0110] is the second input to AND gate 1647, and the output 1666 from AND gate 1647 corresponds to address 0110 0110. A positive output 1666 from AND gate 1647 will fire the motor at address 0110 0110. Output LD(7) 1609 [0111] is the second input to AND gate 1648, and the output 1667 from AND gate 1648 corresponds to address 0110 0111. A positive output 1667 from AND gate 1648 will fire the motor at address 0110 0111.

Output LD(8) 1610 [1000] is the second input to AND gate 1649, and the output 1668 from AND gate 1649 corresponds to address 0110 1000. A positive output 1668 from AND gate 1649 will fire the motor at address 0110 1000. Output LD(9) 1611 [1001] is the second input to AND gate 1650, and the output 1669 from AND gate 1650 corresponds to address 0110 1001. A positive output 1669 from AND gate 1650 will fire the motor at address 0110 1001. Output LD(10) 1612 [1010] is the second input to AND gate 1651, and the output 1670 from AND gate 1651 corresponds to address 0110 1010. A positive output 1670 from AND gate 1651 will fire the motor at address 0110 1010. Output LD(11) 1613 [1011] is the second input to AND gate 1652, and the output 1671 from AND gate 1652 corresponds to address 0110 1011. A positive output 1671 from AND gate 1652 will fire the motor at address 0110 1011.

Output LD(12) 1614 [1100] is the second input to AND gate 1653, and the output 1672 from AND gate 1653 corresponds to address 0110 1100. A positive output 1672 from AND gate 1653 will fire the motor at address 0110 1100. Output LD(13) 1615 [1101] is the second input to AND gate 1654, and the output 1673 from AND gate 1654 corresponds to address 0110 1101. A positive output 1673 from AND gate 1654 will fire the motor at address 0110 1101. Output LD(14) 1616 [1110] is the second input to AND gate 1655, and the output 1674 from AND gate 1655 corresponds to address 0110 1110. A positive output 1674 from AND gate 1655 will fire the motor at address 0110 1110. Output LD(15) 1617 [1111] is the second input to AND gate 1656, and the output 1675 from AND gate 1656 corresponds to address 0110 1111. A positive output 1675 from AND gate 1656 will fire the motor at address 0110 1111.

FIG. 17 shows the configuration for the Adult Entertainment Mode/Medical Limb Cover Mode Motor Fire Decision Matrix for Sector 0111. The specific motor to activate within the body suit can be specified by the output from the high order and low order bits from the two 4×16-bit decoders. The Adult Entertainment Mode/Medical Limb Cover Mode Motor Fire Decision Matrix 1 1720 generates the high order outputs. Output HD 1701 [0110] corresponding to sector 0111 (e.g. the left glove) is the first input into a series of AND gates.

The Adult Entertainment Mode/Medical Limb Cover Mode Motor Fire Decision Matrix 2 1730 generates the low order outputs. A positive input from both the high and low order inputs will activate a body suit motor. Output LD(0) 1702 [0000] is the second input to AND gate 1741, and the output 1760 from AND gate 1741 corresponds to address 0111 0000. No motor is assigned to this address to ensure that the suit does not fire any motors when a clear signal is sent to the register.

Output LD(1) 1703 [0001] is the second input to AND gate 1742, and the output 1761 from AND gate 1742 corresponds to address 0111 0001. A positive output 1761 from AND gate 1742 will fire the motor at address 0111 0001. Output LD(2) 1704 [0010] is the second input to AND gate 1743, and the output 1762 from AND gate 1743 corresponds to address 0111 0010. A positive output 1762 from AND gate 1743 will fire the motor at address 0111 0010. Output LD(3) 1705 [0011] is the second input to AND gate 1744, and the output 1763 from AND gate 1744 corresponds to address 0111 0011. A positive output 1763 from AND gate 1744 will fire the motor at address 0111 0011.

Output LD(4) 1706 [0100] is the second input to AND gate 1745, and the output 1764 from AND gate 1745 corresponds to address 0111 0100. A positive output 1764 from AND gate 1745 will fire the motor at address 0111 0100. Output LD(5) 1707 [0101] is the second input to AND gate 1746, and the output 1765 from AND gate 1746 corresponds to address 0111 0101. A positive output 1765 from AND gate 1746 will fire the motor at address 0111 0101. Output LD(6) 1708 [0110] is the second input to AND gate 1747, and the output 1766 from AND gate 1747 corresponds to address 0111 0110. A positive output 1766 from AND gate 1747 will fire the motor at address 0111 0110. Output LD(7) 1709 [0111] is the second input to AND gate 1748, and the output 1767 from AND gate 1748 corresponds to address 0111 0111. A positive output 1767 from AND gate 1748 will fire the motor at address 0111 0111.

Output LD(8) 1710 [1000] is the second input to AND gate 1749, and the output 1768 from AND gate 1749 corresponds to address 0111 1000. A positive output 1768 from AND gate 1749 will fire the motor at address 0111 1000. Output LD(9) 1711 [1001] is the second input to AND gate 1750, and the output 1769 from AND gate 1750 corresponds to address 0111 1001. A positive output 1769 from AND gate 1750 will fire the motor at address 0111 1001. Output LD(10) 1712 [1010] is the second input to AND gate 1751, and the output 1770 from AND gate 1751 corresponds to address 0111 1010. A positive output 1770 from AND gate 1751 will fire the motor at address 0111 1010. Output LD(11) 1713 [1011] is the second input to AND gate 1752, and the output 1771 from AND gate 1752 corresponds to address 0111 1011. A positive output 1771 from AND gate 1752 will fire the motor at address 0111 1011.

Output LD(12) 1714 [1100] is the second input to AND gate 1753, and the output 1772 from AND gate 1753 corresponds to address 0111 1100. A positive output 1772 from AND gate 1753 will fire the motor at address 0111 1100. Output LD(13) 1715 [1101] is the second input to AND gate 1754, and the output 1773 from AND gate 1754 corresponds to address 0111 1101. A positive output 1773 from AND gate 1754 will fire the motor at address 0111 1101. Output LD(14) 1716 [1110] is the second input to AND gate 1755, and the output 1774 from AND gate 1755 corresponds to address 0111 1110. A positive output 1774 from AND gate 1755 will fire the motor at address 0111 1110. Output LD(15) 1717 [1111] is the second input to AND gate 1756, and the output 1775 from AND gate 1756 corresponds to address 0111 1111. A positive output 1775 from AND gate 1756 will fire the motor at address 0111 1111.

FIG. 18 shows the configuration for the Adult Entertainment Mode/Medical Limb Cover Mode Motor Fire Decision Matrix for Sector 1000. The specific motor to activate within the body suit can be specified by the output from the high order and low order bits from the two 4×16-bit decoders. The Adult Entertainment Mode/Medical Limb Cover Mode Motor Fire Decision Matrix 1 1820 generates the high order outputs. Output HD 1801 [1000] corresponding to sector 1000 (e.g. the right glove) is the first input into a series of AND gates.

The Adult Entertainment Mode/Medical Limb Cover Mode Motor Fire Decision Matrix 2 1830 generates the low order outputs. A positive input from both the high and low order inputs will activate a body suit motor. Output LD(0) 1802 [0000] is the second input to AND gate 1841, and the output 1860 from AND gate 1841 corresponds to address 1000 0000. No motor is assigned to this address to ensure that the suit does not fire any motors when a clear signal is sent to the register.

Output LD(1) 1803 [0001] is the second input to AND gate 1842, and the output 1861 from AND gate 1842 corresponds to address 1000 0001. A positive output 1861 from AND gate 1842 will fire the motor at address 1000 0001. Output LD(2) 1804 [0010] is the second input to AND gate 1843, and the output 1862 from AND gate 1843 corresponds to address 1000 0010. A positive output 1862 from AND gate 1843 will fire the motor at address 1000 0010. Output LD(3) 1805 [0011] is the second input to AND gate 1844, and the output 1863 from AND gate 1844 corresponds to address 1000 0011. A positive output 1863 from AND gate 1844 will fire the motor at address 1000 0011.

Output LD(4) 1806 [0100] is the second input to AND gate 1845, and the output 1864 from AND gate 1845 corresponds to address 1000 0100. A positive output 1864 from AND gate 1845 will fire the motor at address 1000 0100. Output LD(5) 1807 [0101] is the second input to AND gate 1846, and the output 1865 from AND gate 1846 corresponds to address 1000 0101. A positive output 1865 from AND gate 1846 will fire the motor at address 1000 0101. Output LD(6) 1808 [0110] is the second input to AND gate 1847, and the output 1866 from AND gate 1847 corresponds to address 1000 0110. A positive output 1866 from AND gate 1847 will fire the motor at address 1000 0110. Output LD(7) 1809 [0111] is the second input to AND gate 1848, and the output 1867 from AND gate 1848 corresponds to address 1000 0111. A positive output 1867 from AND gate 1848 will fire the motor at address 1000 0111.

Output LD(8) 1810 [1000] is the second input to AND gate 1849, and the output 1868 from AND gate 1849 corresponds to address 1000 1000. A positive output 1868 from AND gate 1849 will fire the motor at address 1000 1000. Output LD(9) 1811 [1001] is the second input to AND gate 1850, and the output 1869 from AND gate 1850 corresponds to address 1000 1001. A positive output 1869 from AND gate 1850 will fire the motor at address 1000 1001. Output LD(10) 1812 [1010] is the second input to AND gate 1851, and the output 1870 from AND gate 1851 corresponds to address 1000 1010. A positive output 1870 from AND gate 1851 will fire the motor at address 1000 1010. Output LD(11) 1813 [1011] is the second input to AND gate 1852, and the output 1871 from AND gate 1852 corresponds to address 1000 1011. A positive output 1871 from AND gate 1852 will fire the motor at address 1000 1011.

Output LD(12) 1814 [1100] is the second input to AND gate 1853, and the output 1872 from AND gate 1853 corresponds to address 1000 1100. A positive output 1872 from AND gate 1853 will fire the motor at address 1000 1100. Output LD(13) 1815 [1101] is the second input to AND gate 1854, and the output 1873 from AND gate 1854 corresponds to address 1000 1101. A positive output 1873 from AND gate 1854 will fire the motor at address 1000 1101. Output LD(14) 1816 [1110] is the second input to AND gate 1855, and the output 1874 from AND gate 1855 corresponds to address 1000 1110. A positive output 1874 from AND gate 1855 will fire the motor at address 1000 1110. Output LD(15) 1817 [1111] is the second input to AND gate 1856, and the output 1875 from AND gate 1856 corresponds to address 1000 1111. A positive output 1875 from AND gate 1856 will fire the motor at address 1000 1111.

FIG. 19 shows the configuration for the Adult Entertainment Mode/Medical Limb Cover Mode Motor Fire Decision Matrix for Sector 1001. The specific motor to activate within the body suit can be specified by the output from the high order and low order bits from the two 4×16-bit decoders. The Adult Entertainment Mode/Medical Limb Cover Mode Motor Fire Decision Matrix 1 1920 generates the high order outputs. Output HD 1901 [1001] corresponding to sector 1001 (e.g. the left sock) is the first input into a series of AND gates.

The Adult Entertainment Mode/Medical Limb Cover Mode Motor Fire Decision Matrix 2 1930 generates the low order outputs. A positive input from both the high and low order inputs will activate a body suit motor. Output LD(0) 1902 [0000] is the second input to AND gate 1941, and the output 1960 from AND gate 1941 corresponds to address 1001 0000. No motor is assigned to this address to ensure that the suit does not fire any motors when a clear signal is sent to the register.

Output LD(1) 1903 [0001] is the second input to AND gate 1942, and the output 1961 from AND gate 1942 corresponds to address 1001 0001. A positive output 1961 from AND gate 1942 will fire the motor at address 1001 0001. Output LD(2) 1904 [0010] is the second input to AND gate 1943, and the output 1962 from AND gate 1943 corresponds to address 1001 0010. A positive output 1962 from AND gate 1943 will fire the motor at address 1001 0010. Output LD(3) 1905 [0011] is the second input to AND gate 1944, and the output 1963 from AND gate 1944 corresponds to address 1001 0011. A positive output 1963 from AND gate 1944 will fire the motor at address 1001 0011.

Output LD(4) 1906 [0100] is the second input to AND gate 1945, and the output 1964 from AND gate 1945 corresponds to address 1001 0100. A positive output 1964 from AND gate 1945 will fire the motor at address 1001 0100. Output LD(5) 1907 [0101] is the second input to AND gate 1946, and the output 1965 from AND gate 1946 corresponds to address 1001 0101. A positive output 1965 from AND gate 1946 will fire the motor at address 1001 0101. Output LD(6) 1908 [0110] is the second input to AND gate 1947, and the output 1966 from AND gate 1947 corresponds to address 1001 0110. A positive output 1966 from AND gate 1947 will fire the motor at address 1001 0110. Output LD(7) 1909 [0111] is the second input to AND gate 1948, and the output 1967 from AND gate 1948 corresponds to address 1001 0111. A positive output 1967 from AND gate 1948 will fire the motor at address 1001 0111.

Output LD(8) 1910 [1000] is the second input to AND gate 1949, and the output 1968 from AND gate 1949 corresponds to address 1001 1000. A positive output 1968 from AND gate 1949 will fire the motor at address 1001 1000. Output LD(9) 1911 [1001] is the second input to AND gate 1950, and the output 1969 from AND gate 1950 corresponds to address 1001 1001. A positive output 1969 from AND gate 1950 will fire the motor at address 1001 1001. Output LD(10) 1912 [1010] is the second input to AND gate 1951, and the output 1970 from AND gate 1951 corresponds to address 1001 1010. A positive output 1970 from AND gate 1951 will fire the motor at address 1001 1010. Output LD(11) 1914 [1011] is the second input to AND gate 1952, and the output 1971 from AND gate 1952 corresponds to address 1001 1011. A positive output 1971 from AND gate 1952 will fire the motor at address 1001 1011.

Output LD(12) 1914 [1100] is the second input to AND gate 1953, and the output 1972 from AND gate 1953 corresponds to address 1001 1100. A positive output 1972 from AND gate 1953 will fire the motor at address 1001 1100. Output LD(13) 1915 [1101] is the second input to AND gate 1954, and the output 1973 from AND gate 1954 corresponds to address 1001 1101. A positive output 1973 from AND gate 1954 will fire the motor at address 1001 1101. Output LD(14) 1916 [1110] is the second input to AND gate 1955, and the output 1974 from AND gate 1955 corresponds to address 1001 1110. A positive output 1974 from AND gate 1955 will fire the motor at address 1001 1110. Output LD(15) 1917 [1111] is the second input to AND gate 1956, and the output 1975 from AND gate 1956 corresponds to address 1001 1111. A positive output 1975 from AND gate 1956 will fire the motor at address 1001 1111.

FIG. 20 shows the configuration for the Adult Entertainment Mode/Medical Limb Cover Mode Motor Fire Decision Matrix for Sector 1010. The specific motor to activate within the body suit can be specified by the output from the high order and low order bits from the two 4×16-bit decoders. The Adult Entertainment Mode/Medical Limb Cover Mode Motor Fire Decision Matrix 1 2020 generates the high order outputs. Output HD 2001 [1010] corresponding to sector 1010 (e.g. the right sock glove) is the first input into a series of AND gates.

The Adult Entertainment Mode /Medical Limb Cover Mode Motor Fire Decision Matrix 2 2030 generates the low order outputs. A positive input from both the high and low order inputs will activate a body suit motor. Output LD(0) 2002 [0000] is the second input to AND gate 2041, and the output 2060 from AND gate 2041 corresponds to address 1010 0000. No motor is assigned to this address to ensure that the suit does not fire any motors when a clear signal is sent to the register.

Output LD(1) 2003 [0001] is the second input to AND gate 2042, and the output 2061 from AND gate 2042 corresponds to address 1010 0001. A positive output 2061 from AND gate 2042 will fire the motor at address 1010 0001. Output LD(2) 2004 [0010] is the second input to AND gate 2043, and the output 2062 from AND gate 2043 corresponds to address 1010 0010. A positive output 2062 from AND gate 2043 will fire the motor at address 1010 0010. Output LD(3) 2005 [0011] is the second input to AND gate 2044, and the output 2063 from AND gate 2044 corresponds to address 1010 0011. A positive output 2063 from AND gate 2044 will fire the motor at address 1010 0011.

Output LD(4) 2006 [0100] is the second input to AND gate 2045, and the output 2064 from AND gate 2045 corresponds to address 1010 0100. A positive output 2064 from AND gate 2045 will fire the motor at address 1010 0100. Output LD(5) 2007 [0101] is the second input to AND gate 2046, and the output 2065 from AND gate 2046 corresponds to address 1010 0101. A positive output 2065 from AND gate 2046 will fire the motor at address 1010 0101. Output LD(6) 2008 [0110] is the second input to AND gate 2047, and the output 2066 from AND gate 2047 corresponds to address 1010 0110. A positive output 2066 from AND gate 2047 will fire the motor at address 1010 0110. Output LD(7) 2009 [0111] is the second input to AND gate 2048, and the output 2067 from AND gate 2048 corresponds to address 1010 0111. A positive output 2067 from AND gate 2048 will fire the motor at address 1010 0111.

Output LD(8) 2010 [1000] is the second input to AND gate 2049, and the output 2068 from AND gate 2049 corresponds to address 1010 1000. A positive output 2068 from AND gate 2049 will fire the motor at address 1010 1000. Output LD(9) 2011 [1001] is the second input to AND gate 2050, and the output 2069 from AND gate 2050 corresponds to address 1010 1001. A positive output 2069 from AND gate 2050 will fire the motor at address 1010 1001. Output LD(10) 2012 [1010] is the second input to AND gate 2051, and the output 2070 from AND gate 2051 corresponds to address 1010 1010. A positive output 2070 from AND gate 2051 will fire the motor at address 1010 1010. Output LD(11) 2014 [1011] is the second input to AND gate 2052, and the output 2071 from AND gate 2052 corresponds to address 1010 1011. A positive output 2071 from AND gate 2052 will fire the motor at address 1010 1011.

Output LD(12) 2014 [1100] is the second input to AND gate 2053, and the output 2072 from AND gate 2053 corresponds to address 1010 1100. A positive output 2072 from AND gate 2053 will fire the motor at address 1010 1100. Output LD(13) 2015 [1101] is the second input to AND gate 2054, and the output 2073 from AND gate 2054 corresponds to address 1010 1101. A positive output 2073 from AND gate 2054 will fire the motor at address 1010 1101. Output LD(14) 2016 [1110] is the second input to AND gate 2055, and the output 2074 from AND gate 2055 corresponds to address 1010 1110. A positive output 2074 from AND gate 2055 will fire the motor at address 1010 1110. Output LD(15) 2017 [1111] is the second input to AND gate 2056, and the output 2075 from AND gate 2056 corresponds to address 1010 1111. A positive output 2075 from AND gate 2056 will fire the motor at address 1010 1111.

FIG. 21 shows the configuration for the Adult Entertainment Mode/Medical Limb Cover Mode Motor Fire Decision Matrix for Sector 1011. The specific motor to activate within the body suit can be specified by the output from the high order and low order bits from the two 4×16-bit decoders. The Adult Entertainment Mode/Medical Limb Cover Mode Motor Fire Decision Matrix 1 2120 generates the high order outputs. Output HD 2101 [1011] corresponding to sector 1011 (e.g. adult entertainment front crotch) is the first input into a series of AND gates.

The Adult Entertainment Mode/Medical Limb Cover Mode Motor Fire Decision Matrix 2 2130 generates the low order outputs. A positive input from both the high and low order inputs will activate a body suit motor. Output LD(0) 2102 [0000] is the second input to AND gate 2141, and the output 2160 from AND gate 2141 corresponds to address 1011 0000. No motor is assigned to this address to ensure that the suit does not fire any motors when a clear signal is sent to the register.

Output LD(1) 2103 [0001] is the second input to AND gate 2142, and the output 2161 from AND gate 2142 corresponds to address 1011 0001. A positive output 2161 from AND gate 2142 will fire the motor at address 1011 0001. Output LD(2) 2104 [0010] is the second input to AND gate 2143, and the output 2162 from AND gate 2143 corresponds to address 1011 0010. A positive output 2162 from AND gate 2143 will fire the motor at address 1011 0010. Output LD(3) 2105 [0011] is the second input to AND gate 2144, and the output 2163 from AND gate 2144 corresponds to address 1011 0011. A positive output 2163 from AND gate 2144 will fire the motor at address 1011 0011.

Output LD(4) 2106 [0100] is the second input to AND gate 2145, and the output 2164 from AND gate 2145 corresponds to address 1011 0100. A positive output 2164 from AND gate 2145 will fire the motor at address 1011 0100. Output LD(5) 2107 [0101] is the second input to AND gate 2146, and the output 2165 from AND gate 2146 corresponds to address 1011 0101. A positive output 2165 from AND gate 2146 will fire the motor at address 1011 0101. Output LD(6) 2108 [0110] is the second input to AND gate 2147, and the output 2166 from AND gate 2147 corresponds to address 1011 0110. A positive output 2166 from AND gate 2147 will fire the motor at address 1011 0110. Output LD(7) 2109 [0111] is the second input to AND gate 2148, and the output 2167 from AND gate 2148 corresponds to address 1011 0111. A positive output 2167 from AND gate 2148 will fire the motor at address 1011 0111.

Output LD(8) 2110 [1000] is the second input to AND gate 2149, and the output 2168 from AND gate 2149 corresponds to address 1011 1000. A positive output 2168 from AND gate 2149 will fire the motor at address 1011 1000. Output LD(9) 2111 [1001] is the second input to AND gate 2150, and the output 2169 from AND gate 2150 corresponds to address 1011 1001. A positive output 2169 from AND gate 2150 will fire the motor at address 1011 1001. Output LD(10) 2112 [1010] is the second input to AND gate 2151, and the output 2170 from AND gate 2151 corresponds to address 1011 1010. A positive output 2170 from AND gate 2151 will fire the motor at address 1011 1010. Output LD(11) 2114 [1011] is the second input to AND gate 2152, and the output 2171 from AND gate 2152 corresponds to address 1011 1011. A positive output 2171 from AND gate 2152 will fire the motor at address 1011 1011.

Output LD(12) 2114 [1100] is the second input to AND gate 2153, and the output 2172 from AND gate 2153 corresponds to address 1011 1100. A positive output 2172 from AND gate 2153 will fire the motor at address 1011 1100. Output LD(13) 2115 [1101] is the second input to AND gate 2154, and the output 2173 from AND gate 2154 corresponds to address 1011 1101. A positive output 2173 from AND gate 2154 will fire the motor at address 1011 1101. Output LD(14) 2116 [1110] is the second input to AND gate 2155, and the output 2174 from AND gate 2155 corresponds to address 1011 1110. A positive output 2174 from AND gate 2155 will fire the motor at address 1011 1110. Output LD(15) 2117 [1111] is the second input to AND gate 2156, and the output 2175 from AND gate 2156 corresponds to address 1011 1111. A positive output 2175 from AND gate 2156 will fire the motor at address 1011 1111.

FIG. 22 shows the configuration for the Adult Entertainment Mode/Medical Limb Cover Mode Motor Fire Decision Matrix for Sector 1100. The specific motor to activate within the body suit can be specified by the output from the high order and low order bits from the two 4×16-bit decoders. The Adult Entertainment Mode/Medical Limb Cover Mode Motor Fire Decision Matrix 1 2220 generates the high order outputs. Output HD 2201 [1011] corresponding to sector 1100 (e.g. adult entertainment rear) is the first input into a series of AND gates.

The Adult Entertainment Mode/Medical Limb Cover Mode Motor Fire Decision Matrix 2 2230 generates the low order outputs. A positive input from both the high and low order inputs will activate a body suit motor. Output LD(0) 2202 [0000] is the second input to AND gate 2241, and the output 2260 from AND gate 2241 corresponds to address 1100 0000. No motor is assigned to this address to ensure that the suit does not fire any motors when a clear signal is sent to the register.

Output LD(1) 2203 [0001] is the second input to AND gate 2242, and the output 2261 from AND gate 2242 corresponds to address 1100 0001. A positive output 2261 from AND gate 2242 will fire the motor at address 1100 0001. Output LD(2) 2204 [0010] is the second input to AND gate 2243, and the output 2262 from AND gate 2243 corresponds to address 1100 0010. A positive output 2262 from AND gate 2243 will fire the motor at address 1100 0010. Output LD(3) 2205 [0011] is the second input to AND gate 2244, and the output 2263 from AND gate 2244 corresponds to address 1100 0011. A positive output 2263 from AND gate 2244 will fire the motor at address 1100 0011.

Output LD(4) 2206 [0100] is the second input to AND gate 2245, and the output 2264 from AND gate 2245 corresponds to address 1100 0100. A positive output 2264 from AND gate 2245 will fire the motor at address 1100 0100. Output LD(5) 2207 [0101] is the second input to AND gate 2246, and the output 2265 from AND gate 2246 corresponds to address 1100 0101. A positive output 2265 from AND gate 2246 will fire the motor at address 1100 0101. Output LD(6) 2208 [0110] is the second input to AND gate 2247, and the output 2266 from AND gate 2247 corresponds to address 1100 0110. A positive output 2266 from AND gate 2247 will fire the motor at address 1100 0110. Output LD(7) 2209 [0111] is the second input to AND gate 2248, and the output 2267 from AND gate 2248 corresponds to address 1100 0111. A positive output 2267 from AND gate 2248 will fire the motor at address 1100 0111.

Output LD(8) 2210 [1000] is the second input to AND gate 2249, and the output 2268 from AND gate 2249 corresponds to address 1100 1000. A positive output 2268 from AND gate 2249 will fire the motor at address 1100 1000. Output LD(9) 2211 [1001] is the second input to AND gate 2250, and the output 2269 from AND gate 2250 corresponds to address 1100 1001. A positive output 2269 from AND gate 2250 will fire the motor at address 1100 1001. Output LD(10) 2212 [1010] is the second input to AND gate 2251, and the output 2270 from AND gate 2251 corresponds to address 1100 1010. A positive output 2270 from AND gate 2251 will fire the motor at address 1100 1010. Output LD(11) 2214 [1011] is the second input to AND gate 2252, and the output 2271 from AND gate 2252 corresponds to address 1100 1011. A positive output 2271 from AND gate 2252 will fire the motor at address 1100 1011.

Output LD(12) 2214 [1100] is the second input to AND gate 2253, and the output 2272 from AND gate 2253 corresponds to address 1 100 1100. A positive output 2272 from AND gate 2253 will fire the motor at address 1100 1100. Output LD(13) 2215 [1101] is the second input to AND gate 2254, and the output 2273 from AND gate 2254 corresponds to address 1100 1101. A positive output 2273 from AND gate 2254 will fire the motor at address 1100 1101. Output LD(14) 2216 [1110] is the second input to AND gate 2255, and the output 2274 from AND gate 2255 corresponds to address 1100 1110. A positive output 2274 from AND gate 2255 will fire the motor at address 1100 1110. Output LD(15) 2217 [1111] is the second input to AND gate 2256, and the output 2275 from AND gate 2256 corresponds to address 1100 1111. A positive output 2275 from AND gate 2256 will fire the motor at address 1100 1111.

FIG. 23 shows the configuration for the Adult Entertainment Mode/Medical Limb Cover Mode Motor Fire Decision Matrix for Sector 1101. The specific motor to activate within the body suit can be specified by the output from the high order and low order bits from the two 4×16-bit decoders. The Adult Entertainment Mode/Medical Limb Cover Mode Motor Fire Decision Matrix 1 2320 generates the high order outputs. Output HD 2301 [1101] corresponding to sector 1101 (e.g. adult entertainment male peripherals) is the first input into a series of AND gates.

The Adult Entertainment Mode/Medical Limb Cover Mode Motor Fire Decision Matrix 2 2330 generates the low order outputs. A positive input from both the high and low order inputs will activate a body suit motor. Output LD(0) 2302 [0000] is the second input to AND gate 2341, and the output 2360 from AND gate 2341 corresponds to address 1101 0000. No motor is assigned to this address to ensure that the suit does not fire any motors when a clear signal is sent to the register.

Output LD(1) 2303 [0001] is the second input to AND gate 2342, and the output 2361 from AND gate 2342 corresponds to address 1101 0001. A positive output 2361 from AND gate 2342 will fire the motor at address 1101 0001. Output LD(2) 2304 [0010] is the second input to AND gate 2343, and the output 2362 from AND gate 2343 corresponds to address 1101 0010. A positive output 2362 from AND gate 2343 will fire the motor at address 1101 0010. Output LD(3) 2305 [0011] is the second input to AND gate 2344, and the output 2363 from AND gate 2344 corresponds to address 1101 0011. A positive output 2363 from AND gate 2344 will fire the motor at address 1101 0011.

Output LD(4) 2306 [0100] is the second input to AND gate 2345, and the output 2364 from AND gate 2345 corresponds to address 1101 0100. A positive output 2364 from AND gate 2345 will fire the motor at address 1101 0100. Output LD(5) 2307 [0101] is the second input to AND gate 2346, and the output 2365 from AND gate 2346 corresponds to address 1101 0101. A positive output 2365 from AND gate 2346 will fire the motor at address 1101 0101. Output LD(6) 2308 [0110] is the second input to AND gate 2347, and the output 2366 from AND gate 2347 corresponds to address 1101 0110. A positive output 2366 from AND gate 2347 will fire the motor at address 1101 0110. Output LD(7) 2309 [0111] is the second input to AND gate 2348, and the output 2367 from AND gate 2348 corresponds to address 1101 0111. A positive output 2367 from AND gate 2348 will fire the motor at address 1101 0111.

Output LD(8) 2310 [1000] is the second input to AND gate 2349, and the output 2368 from AND gate 2349 corresponds to address 1101 1000. A positive output 2368 from AND gate 2349 will fire the motor at address 1101 1000. Output LD(9) 2311 [1001] is the second input to AND gate 2350, and the output 2369 from AND gate 2350 corresponds to address 1101 1001. A positive output 2369 from AND gate 2350 will fire the motor at address 1101 1001. Output LD(10) 2312 [1010] is the second input to AND gate 2351, and the output 2370 from AND gate 2351 corresponds to address 1101 1010. A positive output 2370 from AND gate 2351 will fire the motor at address 1101 1010. Output LD(11) 2314 [1011] is the second input to AND gate 2352, and the output 2371 from AND gate 2352 corresponds to address 1101 1011. A positive output 2371 from AND gate 2352 will fire the motor at address 1101 1011.

Output LD(12) 2314 [1100] is the second input to AND gate 2353, and the output 2372 from AND gate 2353 corresponds to address 1101 1100. A positive output 2372 from AND gate 2353 will fire the motor at address 1101 1100. Output LD(13) 2315 [1101] is the second input to AND gate 2354, and the output 2373 from AND gate 2354 corresponds to address 1101 1101. A positive output 2373 from AND gate 2354 will fire the motor at address 1101 1101. Output LD(14) 2316 [1110] is the second input to AND gate 2355, and the output 2374 from AND gate 2355 corresponds to address 11011 1110. A positive output 2374 from AND gate 2355 will fire the motor at address 1101 1110. Output LD(15) 2317 [1111] is the second input to AND gate 2356, and the output 2375 from AND gate 2356 corresponds to address 1101 1111. A positive output 2375 from AND gate 2356 will fire the motor at address 1101 1111.

FIG. 24 shows the configuration for the Adult Entertainment Mode/Medical Limb Cover Mode Motor Fire Decision Matrix for Sector 1110. The specific motor to activate within the body suit can be specified by the output from the high order and low order bits from the two 4×16-bit decoders. The Adult Entertainment Mode/Medical Limb Cover Mode Motor Fire Decision Matrix 1 2420 generates the high order outputs. Output HD 2401 [1110] corresponding to sector 1110 (e.g. adult entertainment female peripherals) is the first input into a series of AND gates.

The Adult Entertainment Mode/Medical Limb Cover Mode Motor Fire Decision Matrix 2 2430 generates the low order outputs. A positive input from both the high and low order inputs will activate a body suit motor. Output LD(0) 2402 [0000] is the second input to AND gate 2441, and the output 2460 from AND gate 2441 corresponds to address 1110 0000. No motor is assigned to this address to ensure that the suit does not fire any motors when a clear signal is sent to the register.

Output LD(1) 2403 [0001] is the second input to AND gate 2442, and the output 2461 from AND gate 2442 corresponds to address 1110 0001. A positive output 2461 from AND gate 2442 will fire the motor at address 1110 0001. Output LD(2) 2404 [0010] is the second input to AND gate 2443, and the output 2462 from AND gate 2443 corresponds to address 1110 0010. A positive output 2462 from AND gate 2443 will fire the motor at address 1110 0010. Output LD(3) 2405 [0011] is the second input to AND gate 2444, and the output 2463 from AND gate 2444 corresponds to address 1110 0011. A positive output 2463 from AND gate 2444 will fire the motor at address 1110 0011.

Output LD(4) 2406 [0100] is the second input to AND gate 2445, and the output 2464 from AND gate 2445 corresponds to address 1110 0100. A positive output 2464 from AND gate 2445 will fire the motor at address 1110 0100. Output LD(5) 2407 [0101] is the second input to AND gate 2446, and the output 2465 from AND gate 2446 corresponds to address 1110 0101. A positive output 2465 from AND gate 2446 will fire the motor at address 1110 0101. Output LD(6) 2408 [0110] is the second input to AND gate 2447, and the output 2466 from AND gate 2447 corresponds to address 1110 0110. A positive output 2466 from AND gate 2447 will fire the motor at address 1110 0110. Output LD(7) 2409 [0111] is the second input to AND gate 2448, and the output 2467 from AND gate 2448 corresponds to address 1110 0111. A positive output 2467 from AND gate 2448 will fire the motor at address 1110 0111.

Output LD(8) 2410 [1000] is the second input to AND gate 2449, and the output 2468 from AND gate 2449 corresponds to address 1110 1000. A positive output 2468 from AND gate 2449 will fire the motor at address 1110 1000. Output LD(9) 2411 [1001] is the second input to AND gate 2450, and the output 2469 from AND gate 2450 corresponds to address 1110 1001. A positive output 2469 from AND gate 2450 will fire the motor at address 1110 1001. Output LD(10) 2412 [1010] is the second input to AND gate 2451, and the output 2470 from AND gate 2451 corresponds to address 1110 1010. A positive output 2470 from AND gate 2451 will fire the motor at address 1110 1010. Output LD(11) 2414 [1011] is the second input to AND gate 2452, and the output 2471 from AND gate 2452 corresponds to address 1110 1011. A positive output 2471 from AND gate 2452 will fire the motor at address 1110 1011.

Output LD(12) 2414 [1100] is the second input to AND gate 2453, and the output 2472 from AND gate 2453 corresponds to address 1110 1100. A positive output 2472 from AND gate 2453 will fire the motor at address 1110 1100. Output LD(13) 2415 [1101] is the second input to AND gate 2454, and the output 2473 from AND gate 2454 corresponds to address 1110 1101. A positive output 2473 from AND gate 2454 will fire the motor at address 1110 1101. Output LD(14) 2416 [1110] is the second input to AND gate 2455, and the output 2474 from AND gate 2455 corresponds to address 1110 1110. A positive output 2474 from AND gate 2455 will fire the motor at address 1110 1110. Output LD(15) 2417 [1111] is the second input to AND gate 2456, and the output 2475 from AND gate 2456 corresponds to address 1110 1111. A positive output 2475 from AND gate 2456 will fire the motor at address 1110 1111.

FIG. 25 shows the configuration for the Adult Entertainment Mode/Medical Limb Cover Mode Motor Fire Decision Matrix for Sector 1111. The specific motor to activate within the body suit can be specified by the output from the high order and low order bits from the two 4×16-bit decoders. The Adult Entertainment Mode/Medical Limb Cover Mode Motor Fire Decision Matrix 1 2520 generates the high order outputs. Output HD 2501 [1111] corresponding to sector 1111 is the first input into a series of AND gates.

The Adult Entertainment Mode/Medical Limb Cover Mode Motor Fire Decision Matrix 2 2530 generates the low order outputs. A positive input from both the high and low order inputs will activate a body suit motor. Output LD(0) 2502 [0000] is the second input to AND gate 2541, and the output 2560 from AND gate 2541 corresponds to address 1111 0000. No motor is assigned to this address to ensure that the suit does not fire any motors when a clear signal is sent to the register.

Output LD(1) 2503 [0001] is the second input to AND gate 2542, and the output 2561 from AND gate 2542 corresponds to address 1111 0001. A positive output 2561 from AND gate 2542 will fire the motor at address 1111 0001. Output LD(2) 2504 [0010] is the second input to AND gate 2543, and the output 2562 from AND gate 2543 corresponds to address 1111 0010. A positive output 2562 from AND gate 2543 will fire the motor at address 1111 0010. Output LD(3) 2505 [0011] is the second input to AND gate 2544, and the output 2563 from AND gate 2544 corresponds to address 1111 0011. A positive output 2563 from AND gate 2544 will fire the motor at address 1111 0011.

Output LD(4) 2506 [0100] is the second input to AND gate 2545, and the output 2564 from AND gate 2545 corresponds to address 1111 0100. A positive output 2564 from AND gate 2545 will fire the motor at address 1111 0100. Output LD(5) 2507 [0101] is the second input to AND gate 2546, and the output 2565 from AND gate 2546 corresponds to address 1111 0101. A positive output 2565 from AND gate 2546 will fire the motor at address 1111 0101. Output LD(6) 2508 [0110] is the second input to AND gate 2547, and the output 2566 from AND gate 2547 corresponds to address 1111 0110. A positive output 2566 from AND gate 2547 will fire the motor at address 1111 0110. Output LD(7) 2509 [0111] is the second input to AND gate 2548, and the output 2567 from AND gate 2548 corresponds to address 1111 0111. A positive output 2567 from AND gate 2548 will fire the motor at address 1111 0111.

Output LD(8) 2510 [1000] is the second input to AND gate 2549, and the output 2568 from AND gate 2549 corresponds to address 1111 1000. A positive output 2568 from AND gate 2549 will fire the motor at address 1111 1000. Output LD(9) 2511 [1001] is the second input to AND gate 2550, and the output 2569 from AND gate 2550 corresponds to address 1111 1001. A positive output 2569 from AND gate 2550 will fire the motor at address 1111 1001. Output LD(10) 2512 [1010] is the second input to AND gate 2551, and the output 2570 from AND gate 2551 corresponds to address 1111 1010. A positive output 2570 from AND gate 2551 will fire the motor at address 1111 1010. Output LD(11) 2514 [1011] is the second input to AND gate 2552, and the output 2571 from AND gate 2552 corresponds to address 1111 1011. A positive output 2571 from AND gate 2552 will fire the motor at address 1111 1011.

Output LD(12) 2514 [1100] is the second input to AND gate 2553, and the output 2572 from AND gate 2553 corresponds to address 1111 1100. A positive output 2572 from AND gate 2553 will fire the motor at address 1111 1100. Output LD(13) 2515 [1101] is the second input to AND gate 2554, and the output 2573 from AND gate 2554 corresponds to address 1111 1101. A positive output 2573 from AND gate 2554 will fire the motor at address 1111 1101. Output LD(14) 2516 [1110] is the second input to AND gate 2555, and the output 2574 from AND gate 2555 corresponds to address 1111 1110. A positive output 2574 from AND gate 2555 will fire the motor at address 1111 1110. Output LD(15) 2517 [1111] is the second input to AND gate 2556, and the output 2575 from AND gate 2556 corresponds to address 1111 1111. A positive output 2575 from AND gate 2556 will fire the motor at address 1111 1111.

In most applications, a pictorial view of the body part covered by the interactive body suit or interactive limb cover will be provided within a chat room, a software game, or the monitor of a local computer, PDA, or cell phone. As sectors or individual motor points are touched or activated, an information packet is sent to the IP address of the interactive body suit and/or interactive limb cover. The information packet contains the number associated with the 8-bit binary equivalent assigned to a specific motor or sector to activate that specific motor or sector. For example, if the number 16 (base 10) is passed to the interactive body suit, sector 0001 will fire all motors. The number 16 equates to 0001 0000 (base 2) in 8-bit binary code. Since the low order bits are all "0" the chip set directs the power to the game mode. The high order bits 0001 are assigned to the Front Chest sector, and this information packet will cause all motors within that sector to activate.

The interactive body suit software enables an interface on a one-to-one or one-to-many relationship. Hence, two participants can communicate over the Internet with only one participant utilizing an interactive body suit or both participants wearing an interactive body suit. In addition, multiple participants can interact with multiple participants with each in interactive body suits. In the event that more than one participant is utilizing interactive body suits, each participant receives physical touch sensations from the contact points activated. That is, if participant 1 uses the left hand to touch participant 2 on the right arm, participant 1 will feel a physical touch sensation on the left hand and participant 2 will feel a physical touch sensation on the right arm.

The suit can operate using PC-controlled interfaces over the Internet. A web server farm supporting group and private interactive body suit functions along with 3-Dimensional video, audio, and chat room functions for participants can also be supported. Users can interact with each other in voice, video, and data chat rooms whereby a first user can feel a sense of touch when a second user makes contact with a logical representation of the first user.

For game applications, the interactive body suit, interactive limb covers, and all peripheral devices are controlled over the Internet via software on the connected computer or peripheral device and permit users to fully interact with computer and Internet games. The user will feel a touch sensation upon making contact between the object representing the player and other objects within the game. The game mode supports sectors of the body such as arms, legs, chest, back, feet and hands or the entire suit. Hence, the suit is equipped to support various levels of sophistication with respect to the gaming software compared to the software in adult entertainment or medical applications. Gamers can interact either on a player-to-game mode, player-to-player mode, or player-to-many-player mode. Each player wearing an interactive body suit and/or peripherals will feel a touch sensation when the computer representation of the player makes contact with other players or objects.

For adult entertainment applications, virtual relations over the Internet can be initiated using this computer interface. Peripheral devices supporting gloves, socks, and male and female adult entertainment devices are configured with the interactive body suit functionality and to provide touch sensation. Also, rather than interaction with a real person the interaction can be with a computer-generated person or even in response to a person in a digital video data (DVD) or similar data storage and/or entertainment medium.

For medical applications, physical therapy treatment options can be performed using the computer interface. Limb covers are configured with an interface to a PC or PDA-type device to implement massage therapy to the limb. A PDA or similar device can be connected to the suit to implement a treatment regimen controlled by a computer program application running on the PDA. Using the Internet, an actual person on the other end of the connection can perform the treatment regimen or the treatment may be derived from a program running on a remote computer server.

Other applications for simulators are also possible. Touch feedback can be integrated into military simulator training applications for pilots, infantrymen, armor and/or ship crewmen. The touch feedback can be used to create a virtual reality within a virtual aircraft, armored vehicle, ship, or outdoor or indoor environment to simulate contacts with controls, other persons, building structures, equipment, debris, bullets or shrapnel, explosion concussions, or objects (e.g. trees, furniture, etc.).

In operation, each suit possesses a unique Internet address to identify specific user, and each motor will have a logical address with respect to the adult entertainment and medical interactive limb cover devices. Medical interactive limb covers can be equipped with software to drive pre-programmed routines for firing motors in specific sequence or that motor firing sequence can be controlled by the applicable medical software package or application residing on the PC, PDA, the Internet, or by a communication protocol through a cell phone or other mobile communication device. The computer application generating the logical address can be generating video data that is the source data for the contact point touch sensation being duplicated, can be processing video data that is the source data for the contact point touch sensation being duplicated, or can be generating the logical address based on other data to fire selected motors (e.g. a massage therapy program using a specified algorithm).

While the invention has been particularly shown and described with respect to preferred embodiments, it will be readily understood that minor changes in the details of the invention may be made without departing from the spirit of the invention.

I claim:

1. An apparatus for providing a touch sensation to a user of a simulated real world software program supported by a computer comprising:
    a garment covering a portion of the body of the user;
    a plurality of electric-powered oscillating motors embedded within the garment to provide the sensation of touch on different areas of the body of the user;
    a high-speed control interface with a logic address link to each of the oscillating motors and a link to a computer executing the simulated real world software program, supporting multiple modes of operation depending on software program type, said multiple modes comprising a first mode that generates a high order data bit output that activates multiple embedded motors covering an addressed area of the body and a second mode that generates a low order data bit output that activates a single embedded motor covering an addressed point of the body; and said high-speed control interface activates one or more of said oscillating motors upon receipt of a command signal generated by said software program tat translates into an logic address included in an information packet designating the corresponding link to the one or more oscillating motors, which corresponds to a particular desired touch sensation on one or more areas of the body of the user.

2. The apparatus for providing a touch sensation to a user of a simulated real world software program supported by a computer of claim 1 further comprising:

a series of logic OR, NOR, NAND and AND gates organized into flip-flop memory circuits and arranged to form two more 4×16-bit decoders in the control interface to generate both high order binary data outputs for activating multiple embedded motors and low order binary data outputs for activating a single embedded motor, said high order and said low order bits decoded from a single binary data input; and a decision block in the high-speed control interface generating a logic address output to activate the oscillating motor.

3. The apparatus for providing a touch sensation to a user of a simulated real world software program supported by a computer of claim 1 wherein the high-speed control interface comprises one of the following:

an infrared interface;
a Bluetooth interface; or
a universal serial bus (USB) interface.

4. The apparatus for providing a touch sensation to a user of a simulated real world software program supported by a computer of claim 1 wherein the software program is a game entertainment program.

5. The apparatus for providing a touch sensation to a user of a simulated real world software program supported by a computer of claim 1 wherein the software program is an adult entertainment program.

6. The apparatus for providing a touch sensation to a user of a simulated real world software program supported by a computer of claim 1 wherein the software program is a medical application program.

7. The apparatus for providing a touch sensation to a user of a simulated real world software program supported by a computer of claim 1 wherein the portion of the body covered is a limb.

8. A system for creating a touch sensation to a user of a software program supported by a computer comprising:

a snug fitting garment covering a portion of a person's body;

a plurality of logic addressable electric-powered oscillating motors embedded into the garment covering a sector of said body;

a high-speed control interface with a logic address link to each of the oscillating motors, said control interface connected to said computer, and said computer receiving an information packet containing a logic address designating one or more of the oscillating motors; and said software program supported by said computer translates data inputs into the logic address of one or more of the oscillating motors using the high-speed control interface to activate the one or more motors in said sector that corresponds to a particular desired touch sensation on one or more contact points within that sector to support multiple modes of operation depending on the user type, said multiple modes comprising a first mode that generates a high order data bit output that activates multiple embedded motors covering an addressed area of the body and a second mode that generates a low order data bit output that activates a single embedded motor covering an addressed point of the body.

9. The system for creating a touch sensation to a user of a software program supported by a computer of claim 8 further comprising a decision block circuit in the high-speed control interface that includes a 4×16-bit decoder generating bit values to activate all the motors in a sector corresponding to the logic address for said sector.

10. The system for creating a touch sensation to a user of a software program supported by a computer of claim 8 further comprising a decision block circuit in the high-speed control interface that includes an output matrix 4×16-bit decoder generating high order bit values corresponding to the logic address for specified sectors.

11. The system for creating a touch sensation to a user of a software program supported by a computer of claim 10 further comprising a decision block circuit in the high-speed control interface that includes an output matrix 4×16-bit decoder generating low order bit values corresponding to the logic address for an individual motor within a sector.

12. The system for creating a touch sensation to a user of a software program supported by a computer of claim 11 wherein the high order bit and the low order bit values determine the logic address to activate a specified motor within a specified sector to support at least one mode of operation.

13. The system for creating a touch sensation to a user of a software program supported by a computer of claim 8 wherein the touch sensation corresponds to a contact depicted by video data generated by the software program.

14. The system for creating a touch sensation to a user of a software program supported by a computer of claim 8 wherein the touch sensation corresponds to a contact depicted by video data processed by the software program.

15. A method for generating a touch sensation to a person using a computer application comprising the steps of:

providing a snug fitting garment covering a portion of the body of said person;

embedding a plurality of electric-powered oscillating motors in the garment covering said portion of the body;

providing a logic addressable link to each of the oscillating motors using a high-speed control interface connected to the computer application;

generating an information packet containing logic address data designating one or more of the oscillating motors to activate on a computer using the computer application;

transmitting the logic address data to the high-speed control interface; and decoding the logic address data using a first circuit in the high-speed control interface to activate the designated oscillating motors to provide multiple modes of operation depending on the type of software application, said multiple modes comprising a first mode that generates a high order data bit output that activates multiple embedded motors and a second mode that generates a low order data bit output that activates a single embedded motor, and said first circuit comprising two or more 4×16-bit decoders to generate both high order binary data outputs for activating multiple embedded motors and low order binary data outputs for activating a single embedded motor, said high order and said low order bits decoded from a single binary number, wherein an at least 8-bit binary data input can generate at least 16 high order data outputs and at least 225 unique low order binary data outputs which are mapped to the human body.

16. The method for generating a touch sensation to a person using a computer application of claim 15 further comprising the steps of:

organizing the plurality of motors into specified sectors covering a portion of the body; and translating the logic address data using the first circuit into a logic address for a specified sector to activate all motors in that sector and support multiple modes of operation.

17. The method for generating a touch sensation to a person using a computer application of claim 16 wherein the software application is a game.

18. The method for generating a touch sensation to a person using a computer application of claim 15 further comprising the steps of:

organizing the plurality of motors into specified sectors covering a portion of the body;

decoding the logic address data using the first circuit into a high order and low order bit value output; and processing the high order and low order bit value outputs using a fire decision matrix to translate to a logic address to activate one motor which corresponds to a particular touch sensation within one sector and support multiple modes of operation.

19. The method for generating a touch sensation to a person using a computer application of claim 18 wherein the software application is for medical treatment.

20. The method for generating a touch sensation to a person using a computer application of claim 18 wherein the software application is for adult entertainment.

* * * * *